United States Patent Office 3,452,011
Patented June 24, 1969

3,452,011
4-PHENYL-PERHYDROCYCLOALKOXAZINES
Louis L. Skaletzky, Kalamazoo, Mich., assignor to The Upjohn Company, Kalamazoo, Mich., a corporation of Delaware
No Drawing. Filed Jan. 6, 1967, Ser. No. 607,665
Int. Cl. C07d 87/00, 27/02, 87/22
U.S. Cl. 260—244          11 Claims

ABSTRACT OF THE DISCLOSURE

New 4-phenyl and 4-substituted phenyl perhydrocycloalkoxazines and the acid addition salts thereof are produced by heating an α-phenyl (or substituted phenyl) 2-aminocycloalkanemethanol with a reagent selected from alkanals, benzaldehydes, N,N′-carbonyldiimidazole, and phosgene in the presence of potassium or sodium carbonate in an organic solvent. The products in which the nitrogen has a hydrogen atom can be further modified by alkylation, benzylation or alkoxyalkylation. The products are useful as stimulants for the central nervous system of mammals and birds.

CROSS REFERENCES TO RELATED APPLICATION

This application is related to application S.N. 556,892, filed June 13, 1966.

BACKGROUND OF THE INVENTION

Field of invention

This invention relates to new organic compounds and is particularly concerned with new perhydrocycloalkoxazines, the acid addition salts thereof, and the process for production therefor.

SUMMARY OF THE INVENTION

The novel Compounds II and IIa and the process of invention can be illustratively represented by the following sequence of formulae:

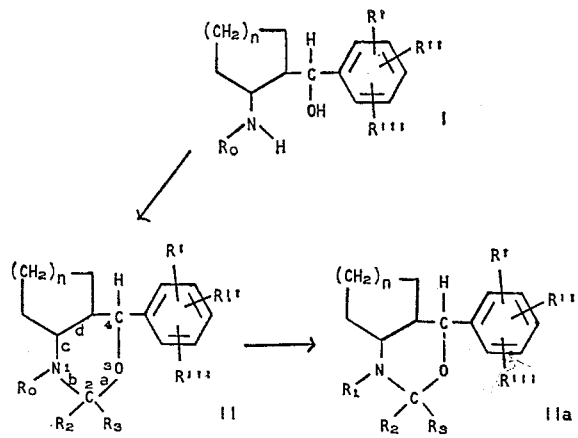

wherein $n$ has the value of 1 to 4, inclusive; wherein $R_0$ is selected from the group consisting of hydrogen, alkyl containing from 1 to 6 carbon atoms, inclusive, cycloalkyl, defined by the Formula III

in which $n$ has the value as above, alkoxyalkyl having from 2 to 6 carbon atoms, inclusive, phenyl and substituted phenyl, and benzyl; wherein $R_1$ is selected from th group consisting of hydrogen, alkyl, alkoxyalkyl and cycloalkyl defined as above, phenyl and substituted phenyl, benzyl, hydroxyalkyl having from 2 to 4 carbon atoms, inclusive, and hydroxyalkyl acylate esters in which the acyl group is of a hydrocarbon carboxylic acid containing from 2 to 12 carbon atoms, inclusive; wherein

is selected from the group consisting of

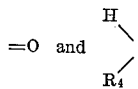

in which $R_4$ is selected from the group consisting of hydrogen, alkyl defined as above, phenyl, and alkyl substituted phenyl in which alkyl is defined as above; and wherein R′, R″ and R‴ are selected from the group of substituents consisting of hydrogen, halogen, alkyl and alkoxy containing from 1 to 6 carbon atoms, inclusive, and —CF$_3$.

The invention further includes the compounds of Formulae II and IIa when in the form of the acid addition salts, particularly in the form of pharmaceutically acceptable acid addition salts.

DESCRIPTION OF THE PREFERRED EMBODIMENT

Examples of the cycloalkyl radical illustratively represented by the Formula III:

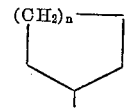

are cyclophentyl, cyclohexyl, cycloheptyl, and cyclooctyl. The same radicals are examples of $R_0$ and $R_1$.

Illustrative examples of alkyl groups having from 1 to 6 carbon atoms are methyl, ethyl, propyl, isopropyl, butyl, isobutyl, tertiary butyl, pentyl, 2-methylbutyl, neopentyl, hexyl, 2-methylpentyl, 3-methylpentyl, and the like.

Illustrative examples of the acyl groups of hydrocarbon carboxylic acids are particularly the acyl groups of alkanoic acids of 2 to 12 carbon atoms, e.g., acetyl, propionyl, butyryl, isobutyryl, valeryl, isovaleryl, hexanoyl, octanoyl, decanoyl, lauroyl; of cycloalkanoic acids, e.g., cyclohexanecarbonyl, β-cyclopentylpropionyl; of benzoic and aralkanoic acids, e.g., benzoyl, phenylacetyl, 3-phenylpropionyl, o-, m-, and p-toluoyl, p-ethylbenzoyl, p-propylbenzoyl; of alkenoic acids, e.g., acryloyl, crotonoyl, chrysanthemummonocarbonyl, cinnamoyl, hexenoyl; of alkynoic acids, e.g., propioloyl, 2- and 3-butynoyl, and the like.

Under halogen substituents for R′, R″ or R‴ is understood fluorine, chlorine, bromine and iodine.

Representative hydroxyalkyl groups are 2-hydroxyethyl, 3-hydroxypropyl, 4-hydroxybutyl, 5-hydroxypentyl, 6-hydroxyhexyl, 2-hydroxypropyl, 2-hydroxybutyl, 3-hydroxypentyl, and the like.

Representative alkoxyalkyl groups are methoxymethyl, 2-methoxyethyl, 3-methoxypropyl, 4-methoxybutyl, 5-methoxypentyl, 3-methoxypentyl, 2-ethoxyethyl, and the like.

Substituted phenyl signifies the radical of formula:

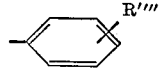

wherein R'''' is selected from the group consisting of alkyl and alkoxy containing from 1 to 6 carbon atoms, inclusive, for example, o-, m-, and p-tolyl, o-, m-, and p-ethylphenyl, o-, m-, and p-butylphenyl, o-, m-, and p-anisyl, o-, m-, and p-butoxyphenyl, and the like.

The process of the present invention comprises: heating an alcohol of Formula I with a reagent selected from the group consisting of aldehydes of the formula:

in which $R_4$ is defined as above, N,N'-carbonyldimidazole, and phosgene in the presence of potassium or sodium carbonate, in an inert organic solvent to obtain the desired perhydrocycloalkoxazine II. To obtain the range of products designated IIa a compound of Formula II in which $R_o$ is hydrogen, is treated with selected alkyl, cycloalkyl, alkoxyalkyl or benzyl halides to give the corresponding N-alkyl, N-cycloalkyl, N-alkoxyalkyl or N-benzyl substituted products or II ($R_o$=H) can be treated with hydroxyalkyl halides or alkylene oxides to give alcohols which can be additionally esterified in known manner. Treatment of about stoichiometric amounts of the amino compounds of Formula II or IIa

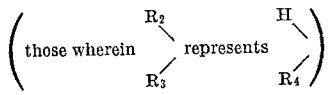

with inorganic and organic acids, e.g., hydrochloric, hydrobromic, perchloric, sulfuric, methanesulfonic, p-toluenesulfonic, cyclohexanesulfamic, phosphoric, acetic, propionic, lactic, tartaric, maleic, malic, citric, succinic, benzoic, phenylacetic, 3-phenylpropionic, and lauric acids, provdes the acid addition salts.

The compounds of Formulae II and IIa, including acid addition salts thereof are useful stimulating agents, which act on the central nervous system. They can be used for stimulation of the respiratory, medullary, vagal and vasomotoric centers of mammals and birds.

They may be administered to mammals and birds by both oral and parenteral routes. For oral administration, the new compounds of Formulae II and IIa, as well as the acid addition salts, can be compounds into solid and liquid unit dosage forms such as tablets, capsules, powders, granules, syrups, elixirs and the like, containing the appropriate amounts for treatment. For tablets, common pharmaceutically acceptable carriers are used such as starch, lactose, kaolin, dicalcium phosphate and the like. The Compounds II and IIa can also be given as powders, particularly in gelatin capsules with or without carriers such as methylcellulose, magnesium stearate, calcium stearate, talc and the like. For fluid preparations, these compounds may be dissolved or suspended in aqueous alcoholic vehicles with or without buffering agents and flavoring mixtures.

The thus-obtained pharmaceutical formulations are administered to animals for the treatment of conditions associated with respiratory difficulties, e.g., pneumonia, bronchitis, asthma or with heart insufficiencies to stimulate heart activity and respiration. In particular, these compounds are useful as geriatric stimulants for pet animals. Dosages between 0.1–10 mg./kg. of body weight per day produce significant stimulation.

As noted above, the new amino compounds of Formulae II and IIa can be used in the form of their acid addition salts with inorganic or organic acids, for example, hydrochlorides lactates, sulfates, tartrates, hydroiodides, hydrobromides, and the like. Moreover, the fluosilicates of these compounds are useful mothproofing agents, according to U.S. Patent 1,915,334 and 2,075,359. The thiocyanic acid addition salts of the same compounds can be condensed with formaldehyde to form resinous polymers which according to U.S. Patents 2,425,320 and 2,606,155 are useful pickling inhibitors. The trichloroacetic acid addition salts of the same compounds are useful as herbicides, for example, against Johnson grass, yellow foxtail, green foxtail, Bermuda grass and quack grass.

The compounds of Formula II in which $R_2$ and $R_3$ together are oxygen, are also useful intermediates for the production of 1,3-(N-methylalkylamino)alcohols possessing strong central nervous system stimulatory activity. For this purpose, the oxazinone compound, e.g., octahydro-4-(p-methoxyphenyl)-1 - methyl - 2H - cyclohex[d][1,3] oxazin-2-one (cis B form):

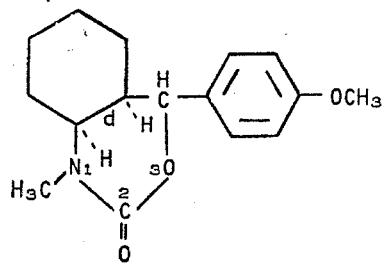

is reduced with a metal hydride, e.g., lithium aluminum hydride, to give cis-B-α-(p-methoxyphenyl)-2-(dimethylamino)cyclohexanemethanol:

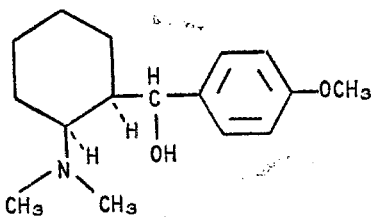

Since the compounds of Formulae II and IIa have at least 3 asymmetric centers, the products II and IIa can exist in different geometrical and optically active configurations, as well as in racemic mixtures.

The starting materials of Formula I are prepared as shown in detail in the preparations.

In carrying out the process of the present invention, an alcohol of Formula I is reacted with an aldehyde corresponding to Formula IV, preferably in an organic, non-reactive solvent such as benzene, toluene, cyclohexane, Skellysolve B hexanes, cycloheptane, tetrahydrofuran, mixtures thereof and the like. The reaction is generally carried out at temperatures between 60–120° C. and conveniently at the reflux temperature of the reaction mixture. The aldehyde is generally used in excess of the stoichiometric requirements, usually using quantities between 1.1 to 10 times the calculated amounts. Since water is eliminated in the condensation reaction, water-free reactants and solvents are generally used and in the preferred embodiment of this invention, measures are taken to eliminate the water produced during the reaction. When the reaction is carried out by reflux, this is particularly easily arranged by water traps or by the convenient use of molecular sieves consisting of absorbent materials such as aluminum silicates. The time required for the reaction is between .1 and 36 hours and at temperatures between 75–100° C.; a time of 10–24 hours is generally necessary.

After the reaction is completed, the product is isolated and purified by conventional means such as evaporation of the solvent, recrystallization, chromatography, extraction, trituration and the like and combinations thereof.

If the compound of Formula II is selected to be an oxazinone ($R_2$ and $R_3$ together are oxygen), the alcohol of Formula I is reacted with a compound such as N, N'-carbonyldimidazole or phosgene gas at temperatures between 0–50° C., conveniently at room temperature (about 20–30° C.), when N,N'-carbonyldiimidazole is used, and at about 0° C. when phosgene is used. In the latter case, also a basic reagent is necessary such as sodium or potassium carbonate. As solvents in this reaction, the same solvents, as with aldehydes, can be used. The isolation and purification of the product is carried out by conventional methods such as removal of the solvent, generally at low temperature in vacuo, crystallization, recrystallization, and chromatography and the like.

The compounds of Formula II, in which $R_o$ is hydrogen, can be further modified by reacting them with alkyl iodide or bromide in the presence of a strong base, such as sodium hydride, potassium hydride or the like when

is oxygen, or in the presence of sodium carbonate or potassium carbonate when

to provide the corresponding alkylated compounds of Formula IIa in which $R_1$ is alkyl. In similar manner, benzyl chloride or bromide, hydroxyalkyl or alkoxyalkyl bromides or iodides, or cycloalkyl bromides or iodides, can be added to give compounds of Formula IIa in which $R_1$ is benzyl, cycloalkyl, alkoxyalkyl or hydroxyalkyl. A further method to obtain hydroxyalkyl compounds is reacting a compound of Formula II in which $R_o$ is hydrogen, with an alkylene epoxide such as ethylene oxide, methylethylene oxide, 1,2- and 2,3-butene epoxides or the like, in ethanol or methanol solution, generally at room temperature.

The hydroxyalkyl substituted compounds of Formula IIa can be further esterified in conventional manner, that is, with acid anhydrides and acid chlorides or bromides of hydrocarbon carboxylic acids containing from 2 to 12 carbon atoms, particularly alkanoic acids such as acetic acid, propionic acid, butyric acid, valeric acid, hexanoic acid, heptanoic acid, octanoic acid, lauric acid; cycloalkanecarboxylic acids, e.g., cyclohexanecarboxylic acid; phenylalkanoic acids, e.g., phenylacetic acid; benzoic acid; 3-phenylpropionic acid; unsaturated acids such as crotonic acid, acrylic acid, 1-butynoic acid, 2-hexynoic acid, chrysanthemummonocarboxylic acid; dicarboxylic acids, e.g., succinic acid, and the like.

The following examples are illustrative of the process and the products of the present invention, but are not to be construed as limiting.

PREPARATION 1

2-(3,4,5-trimethoxybenzoyl)cyclohexanone

A mixture of 147 g. (1.5 moles) of cyclohexanone and 213.3 g. (3 moles) of pyrrolidine was refluxed in 2250 ml. of benzene in a flask equipped with an azeotropic separator. After the water formed during the reaction was collected, the solution was evaporated to dryness in vacuo and the resulting crude oil, consisting of 1-pyrrolidino-1-cyclohexene, was used directly for the next step.

A solution of 3,4,5-trimethoxybenzoyl chloride (138.3 g.; 0.6 mole) in 240 ml. of chloroform was added during a period of 2 hours to a solution of the crude 1-pyrrolidino-1-cyclohexene in 630 ml. of chloroform, in a nitrogen atomsphere, with continuous stirring, while keeping the temperature 5 to 10° C. After the solution was stirred overnight (about 18 hours), at room temperature (about 22 to 25° C.), there was added 900 ml. of 10% aqueous hydrochloric acid, and the resulting mixture was stirred at room temperature for 2 hours. The aqueous layer was extracted with two 150-ml. portions of chloroform, and the chloroform extracts were combined with the chloroform layer above. The combined extracts were washed with water, saturated aqueous sodium bicarbonate solution, water and saturated salt solution. The thus-obtained chloroform solution was dried by passing it through anhydrous sodium sulfate and the dry solution was evaporated to give a residue which was crystallized from methanol to yield 100 g. of long, colorless needles of 2-(3,4,5-tirmethoxybenzoyl)cyclohexanone of melting point 141–142° C.

*Analysis.*—Calcd. for $C_{16}H_{20}O_5$: C, 65.74; H, 6.90. Found: C, 65.48; H, 6.84.

PREPARATION 2

2-(3,4,5-trimethoxybenzoyl)cyclopentanone

A mixture of 126 g. (1.5 moles) of cyclopentanone and 213.3 g. (3 moles) of pyrrolidine was refluxed in 2250 ml. of benzene in a flask equipped with an azeotropic separator. After the calculated amount of water, produced during the condensation, had been collected, the reaction mixture was evaporated to give as an oil 1-pyrrolidino-1-cyclopentene.

A solution of 3,4,5-trimethoxybenzoyl chloride (138.3 g.; 0.6 mole) in chloroform was added to a chloroform solution of the oily 1-pyrrolidino-1-cyclopentene over a period of 1 hour. The reaction mixture was thereupon worked up as in Preparation 1 to give a brown oil weighing 190 g. This oil was dissolved in 500 ml. of ethanol and the ethanol solution was added to a solution of 172 g. of cupric acetate monohydrate in 2600 ml. of water. The mixture was stirred for ½ hour, cooled and filtered, providing a crude copper complex of 2-(3,4,5-trimethoxybenzoyl)cyclopentanone. This product was crystallized from methylene chloride to give 70 g. of the pure copper complex melting at 206–208° C.

*Analysis.*—Calcd. for $C_{30}H_{34}CuO_{10}$: C, 58.29; H, 5.54; Cu, 10.28. Found: C, 58.58; H, 5.81; Cu, 9.49.

The thus-obtained copper complex (70 g.) was dissolved in 350 ml. of chloroform and decomposed with 670 ml. of 10% aqueous hydrochloric acid to give 60 g. (yield 36%) of 2-(3,4,5-trimethoxybenzoyl)cyclopentanone having a melting point of 81–86° C. A sample of this material was recrystallized from Skellysolve B hexanes to give 2 - (3,4,5 - trimethoxybenzoyl)cyclopentanone of melting point 92–95° C.

*Analysis.*—Calcd. for $C_{15}H_{18}O_5$: C, 64.73; H, 6.52. Found: C, 64.95; H, 6.52.

In a run twice the size of the above synthesis, a yield of 47% was obtained.

PREPARATION 3

2-(3,4,5-trimethoxybenzoyl)cycloheptanone

A mixture of 500 g. of cycloheptanone (4.5 moles), 785 g. of morpholine (9 moles), 900 ml. of toluene and 5 g. of p-toluene-sulfonic acid was refluxed for 23 hours, collecting the water produced in the reaction with an azeotropic separator. Ninety-eight ml. of a lower phase was collected and discarded. The remaining mixture was then evaporated in vacuo to give an oil which was distilled. The fraction boiling between 119–125° C. consisted essentially of 262.7 g. of 1-morpholino-1-cycloheptene (32% yield).

In the manner given in Preparation 1, 3,4,5-trimethoxybenzoyl chloride (92.5 g.; 0.4 mole) was reacted with 181.37 g. (1 mole) of 1-morpholino-1-cycloheptene. The crude product was crystallized from 500 ml. of methanol and gave a first crop of 26 g. of 2-(3,4,5-trimethoxybenzoyl)cycloheptanone of melting point 99–100° C. After two more recrystallizations from methanol, the product had a melting point of 107–108° C.

*Analysis.*—Calcd. for $C_{17}H_{22}O_5$: C, 66.65; H, 7.24. Found: C, 66.16; H, 7.48.

From the above methanolic filtrate another 48.3 g. of 2-(3,4,5-trimethoxybenzoyl)cycloheptanone was obtained as a second crop. The total yield was 61%.

PREPARATION 4

2-(p-methoxybenzoyl)cyclohexanone

A solution of 167 g. (0.98 mole) of p-anisoyl chloride in 480 ml. of chloroform was added during a period of 1.5 hours to a solution of 371.7 g. (2.46 moles) of distilled 1-pyrrolidino-1-cyclohexene in 1260 ml. of chloroform. The temperature was kept between 5–10° C. by cooling with ice. After stirring for a period of about 20 hours at room temperature, the mixture was decomposed by addition of 1800 ml. of 10% aqueous hydrochloric acid over a period of 20 minutes. The mixture was then stirred for 2 hours, allowed to settle, the organic layer was separated and the aqueous layer extracted twice with 250-ml. portions of chloroform. The original organic layer and the chloroform extracts were combined, washed with water, saturated salt solution, and then dried by passage through anhydrous sodium sulfate and evaporated. The residue resulting from the above evaporation was a brown oil which was dissolved in 1 l. of ethanol and added to a solution of 344 g. of cupric acetate monohydrate in 5200 ml. of water, preheated to 65° C. The mixture was stirred for 0.5 hour, cooled to room temperature and filtered. The obtained precipitate was washed with water and then with ether. It was then dissolved in 800 ml. of chloroform and added to a solution of 300 ml. of concentrated hydrochloric acid in 1100 ml. of water. The mixture was stirred for 1 hour. The organic layer was separated, and the aqueous layer was extracted once with chloroform. The combined chloroform original layer and extract were washed with water, saturated salt solution, dried by passing through anhydrous sodium sulfate and evaporated to give a solid which was crystallized from 7 l. of methanol, yielding 136.5 g. of 2-(p-methoxybenzoyl)cyclohexanone having a melting point of 115–128° C. A second crop of 26 g., melting point 116–127° C., was obtained from the mother liquor; the total yield was 71%. A recrystallized sample from methanol of 2-(p-methoxybenzoyl)cyclohexanone had a melting point of 117–122° C.

Analysis.—Calcd. for $C_{14}H_{16}O_3$: C, 72.39; H, 6.94. Found: C, 72.30; H, 7.05.

PREPARATION 5

2-(p-methoxybenzoyl)cyclopentanone

In the manner given in Preparation 2, 204 g. (1.2 moles) of p-anisoyl chloride was reacted with 1-pyrrolidino-1-cyclopentene prepared from 252 g. (3 moles) of cyclopentanone. The crude product was converted to the copper complex as in Preparation 4, the complex being crystallized from chloroform-ether to give 80 g. of copper complex of 2-(p-methoxybenzoyl)cyclopentanone with a melting point of 252° C. (dec.). The copper complex was decomposed with hydrochloric acid to give 67 g. of an oil which was crystallized from methanol to give 13.9 g. of 2-(p-methoxybenzoyl)-cyclopentanone of melting point 82–83° C. The filtrate from the first crystallization was evaporated to dryness and the residue crystallized from ether-Skellysolve B hexanes to give 30.1 g. of a second crop of 2-(p-methoxybenzoyl)cyclopentanone of melting point 76–77° C. (total yield 17%). Two recrystallizations from methanol gave 2-(p-methoxybenzoyl)cyclopentanone having a melting point of 83–87° C.

Analysis.—Calcd. for $C_{13}H_{14}O_3$: C, 71.54; H, 6.47. Found: C, 71.83; H, 6.48.

PREPARATION 6

2-(p-ethoxybenzoyl)cyclohexanone

In the manner given in Preparation 2, 1-piperidino-1-cyclohexene was reacted with p-ethoxybenzoyl chloride in chloroform solution to give, after the copper complex purification procedure (Preparation 2), 2-(p-ethoxybenzoyl)cyclohexanone.

PREPARATION 7

2-(o-methoxybenzoyl)cyclohexanone

In the manner given in Preparation 2, 1-piperidino-1-cyclohexene was reacted with o-methoxybenzoyl chloride in chloroform solution to give, after the copper complex purification procedure (Preparation 2), 2-(o-methoxybenzoyl)cyclohexanone of melting point 65–68° C.

PREPARATION 8

2-(2-methoxy-4-methylbenzoyl)cyclohexanone

In the manner given in Preparation 2, 1-piperidino-1-cyclohexene was reacted with 2-methoxy-4-methylbenzoyl chloride in chloroform solution to give, after the copper complex purification procedure (Preparation 2), 2-(2-methoxy-4-methylbenzoyl)cyclohexanone.

PREPARATION 9

2-(3,5-dimethyl-4-methoxybenzoyl)cyclohexanone

In the manner given in Preparation 2, 1-pyrrolidino-1-cyclohexene was reacted with 3,5-dimethyl-4-methoxybenzoyl chloride in chloroform solution to give, after the copper complex purification procedure (Preparation 2), 2 - (3,5 - dimethyl - 4 - methoxybenzoyl)cyclohexanone of melting point 125–126° C.

PREPARATION 10

2-(p-trifluoromethylbenzoyl)cyclohexanone

In the manner given in Preparation 2, 1-piperidino-1-cyclohexene was reacted with p-trifluoromethylbenzoyl chloride in chloroform solution to give, after the copper complex purification procedure (Preparation 2), 2-(p-trifluoromethylbenzoyl)cyclohexanone.

PREPARATION 11

2-(p-chlorobenzoyl)cyclohexanone

In the manner given in Preparation 2, 1-piperidino-1-cyclohexene was reacted with p-chlorobenzoyl chloride in chloroform solution to give, after the copper complex purification procedure (Preparation 2), 2-(p-chlorobenzoyl)cyclohexanone.

PREPARATION 12

2-(o-methylbenzoyl)cyclohexanone

In the manner given in Preparation 2, 1-piperidino-1-cyclohexene was reacted with o-methylbenzoyl chloride in chloroform solution to give, after the copper complex purification procedure (Preparation 2), 2-(o-methylbenzoyl)cyclohexanone.

PREPARATION 13

2-(p-methylbenzoyl)cyclohexanone

In the manner given in Preparation 2, 1-pyrrolidino-1-cyclohexene was reacted with p-methylbenzoyl chloride in chloroform solution to give, after the copper complex purification procedure (Preparation 2), 2-(p-methylbenzoyl)cyclohexanone of melting point 108–110° C.

PREPARATION 14

2-(2,4-dimethylbenzoyl)cyclohexanone

In the manner given in Preparation 2, 1-pyrrolidino-1-cyclohexene was reacted with 2,4-dimethylbenzoyl chloride in chloroform solution to give, after the copper complex purification procedure (Preparation 2), 2-(2,4-dimethylbenzoyl)cyclohexanone of melting point 51–52.5° C.

PREPARATION 15

2-(2-methoxy-4-methylbenzoyl)cyclohexanone

In the manner given in Preparation 2, 1-piperidino-1-cyclohexene was reacted with 2-methoxy-4-methylbenzoyl chloride in chloroform solution to give, after the copper complex purification procedure (Preparation 2), 2-(2-methoxy-4-methylbenzoyl)cyclohexanone.

PREPARATION 16

2-(p-ethoxybenzoyl)cyclooctanone

In the manner given in Preparation 2, 1-morpholino-1-cyclooctene was reacted with p-ethoxybenzoyl chloride in chloroform solution to give, after the copper complex purification procedure (Preparation 2), 2-(p-ethoxybenzoyl)cyclooctanone.

PREPARATION 17

2-(2,3,4-trimethoxybenzoyl)cyclooctanone

In the manner given in Preparation 2, 1-piperidino-1-cyclooctene was reacted with 2,3,4-trimethoxybenzoyl chloride in chloroform solution to give, after the copper complex purification procedure (Preparation 2), 2-(2,3,4-trimethoxybenzoyl)cyclooctanone.

PREPARATION 18

2-(p-bromobenzoyl)cyclooctanone

In the manner given in Preparation 2, 1-piperidino-1-cyclooctene was reacted with p-bromobenzoyl chloride in chloroform solution to give, after the copper complex purification procedure (Preparation 2), 2-(p-bromobenzoyl)cyclooctanone.

PREPARATION 19

2-(m-methylbenzoyl)cyclooctanone

In the manner given in Preparation 2, 1-piperidino-1-cyclooctene was reacted with m-methylbenzoyl chloride in chloroform solution to give, after the copper complex purification procedure (Preparation 2), 2-(m-methylbenzoyl)cyclooctanone In the same manner given in the foregoing preparations, other 2-benzoylcycloalkanones are prepared by reacting a 1-cyclicamino-1-cycloalkene, wherein the cycloalkene moiety has from 5 to 8 nuclear carbon atoms, inclusive, and the cyclicamino moiety has from 5 to 10 nuclear atoms, inclusive, e.g., morpholino, pyrrolidino, piperidino and the like with a selected benzoyl chloride. Representative compounds, thus prepared, include: 2-(3,5 - diiodobenzoyl)cyclopentanone; 2 - (p-fluorobenzoyl)cyclohexanone; 2 - (2 - methoxy - 4 - chlorobenzoyl)cyclohexanone; 2 - (2 - methoxy - 3 - methylbenzoyl)cyclohexanone; 2 - (2 - methyl - 4 - trifluoromethylbenzoyl)cyclohexanone; 2 - (3,4 - dipropylbenzoyl)cycloheptanone; 2 - (2,5 - dichlorobenzoyl)cycloheptanone; 2 - (3,4 - dichlorobenzoyl)cyclooctanone; 2 - (p-propoxybenzoyl)cyclooctanone; 2 - (2,5 - diiodobenzoyl)cycloheptanone; 2- (m - fluorobenzoyl)cyclopentanone; 2- (p - bromobenzoyl)cyclopentanone; 2 - (p - hexylbenzoyl)cyclopentanone; 2 - (m - pentylbenzoyl)cyclohexanone; 2 - (o - butylbenzoyl)cyclohexanone; 2 - (o - propylbenzoyl)cycloheptanone; 2 - (m - ethylbenzoyl)cyclooctanone; 2 - (2 - methoxy - 5 - bromobenzoyl)cyclopentanone; 2 - benzoylcyclooctanone; 2 - benzoylcycloheptanone; and the like.

PREPARATION 20

Cis-A-α-(p-methoxyphenyl)-2-(methylamino)cyclohexanemethanol

A solution of 58 g. (0.25 mole) of 2-(p-methoxybenzoyl)cyclohexanone, 91 g. (0.75 mole) of N-methylbenzylamine and 1.6 g. of p-toluenesulfonic acid monohydrate in 2 l. of toluene was heated at reflux for 20 hours, collecting 4 ml. of water in a Dean-Stark trap. The mixture was then concentrated in vacuo to give a residue which was taken up in 400 ml. of ethanol and hydrogenated in the presence of 2.5 g. of platinum oxide catalyst during a period of 18 hours at a hydrogen pressure between 5 and 30 p.s.i. Thereafter, the reaction mixture was filtered to remove the catalyst and the yellowish filtrate was hydrogenated in the presence of 4.0 g. of 10% palladium-on-carbon catalyst for a period of 20 hours. The mixture was again filtered to remove the catalyst and evaporated in vacuo to give a residue. This residue was dissolved in 600 ml. of ether and 500 ml. of 10% aqueous acetic acid. The mixture was stirred for 1 hour, the acetic acid layer was separated, basified with 20% aqueous sodium hydroxide solution and the oil which separated was extracted into methylene chloride. The methylene chloride layer was washed with water, saturated sodium chloride solution, then dried over anhydrous magnesium sulfate and concentrated in vacuo to give a residue. This residue was recrystallized from a mixture of etherpentane to give a combined amount of material (from two crops) of 31.85 g. (51%) of cis-A-α-(p-methoxyphenyl) - 2 - (methylamino)cyclohexanemethanol. After recrystallization from Skellysolve B hexanes, the material had a melting point of 88–90° C. Ultraviolet: $\lambda_{max}$. 225 (11,250); 276 (1,550); 282 (1,350).

*Analysis.*—Calcd. for $C_{15}H_{23}NO_2$: C, 72.25; H, 9.30; N, 5.62. Found: C, 72.17; H, 9.45; N, 5.55.

PREPARATION 21

Cis-B-α-(p-methoxyphenyl)-2-(methylamino)cyclohexanemethanol

To 80 ml. of trifluoroacetic acid at 0–10° C. was added 10 g. of cis-A-α-(p-methoxyphenyl)-2-(methylamino)cyclohexanemethanol and the resulting mixture was stirred at 10–25° C. for a period of 45 minutes. The reaction mixture was cooled in an ice bath and to it was added 60 g. of ice, 200 ml. of water, and 200 ml. of 20% aqueous sodium hydroxide. The mixture was stirred for 45 minutes and then extracted with methylene chloride. The methylene chloride extracts were washed with water, saturated sodium chloride solution, and dried over anhydrous magnesium sulfate. The dried material was evaporated to give 9.45 g. of a gummy residue. Vapor-phase chromatography showed four components in the gum of which 77.3% was the desired B isomer, 14.2% was isomer A and 8.5% was a mixture of extraneous matter. The gum was dissolved in 100 ml. of pentane and seeded with a sample of the desired product from a previous run [the seed was obtained by converting a sample of gum from a previous run to the oxalate salt of cis-B-α-(p-methoxyphenyl) - 2 - (methylamino)cyclohexanemethanol, which after recrystallization from methanol-ether had a melting point of 227°–228° C., and then converting the salt to the free base by the addition of aqueous sodium hydroxide]. After seeding, crude cis-B-α-(p - methoxyphenyl) - 2 - (methylamino)cyclohexanemethanol was obtained in two crops in a total of 7.16 g. (71.6%). The analytical sample, recrystallized from ether-Skellysolve B hexanes, melted at 92–93° C. Ultraviolet: $\lambda_{max}$. 225 (11,200); 275 (1,550); 282 (1,300).

*Analysis.*—Calcd. for $C_{15}H_{23}NO_2$: C, 72.25; H, 9.30; N, 5.62. Found: C, 72.61; H, 9.45; N, 5.89.

PREPARATION 22

Cis-A-α-(p-methoxyphenyl)-2-(benzylamino)cyclohexanemethanol and its hydrochloride A solution of 23.0 g. (0.099 mole) of 2-(p-methoxybenzoyl)cyclohexanone and 11.0 g. (0.103 mole) of benzylamine in 150 ml. of benzene was heated at reflux for 1.5 hours. The water from the reaction was collected— 2.2 ml. The reaction mixture was then concentrated in vacuo to give a residue which was taken up in 150 ml. of ethanol and hydrogenated in the presence of 1.5 g. of platinum oxide catalyst for a period of 18 hours. The reaction mixture was then filtered, the filtrate concentrated in vacuo and the resulting residue taken up into 200 ml. of 10% aqueous acetic acid and 300 ml. of ether. This mixture was stirred for 1.5 hours, the acid layer was separated, basified with 20% aqueous sodium hydroxide solution to give an oily material which separated. This oil was extracted with methylene chloride, the methylene chloride extracts were washed with water, saturated sodium chloride solution and dried over anhydrous magnesium sulfate. After evaporation of the reaction mixture, 22.8 g. of an oil was left which gave with hydrogen chloride in ether a hydrochloride which was recrystallized from ethanol-ether to give 18.35 g. of cis-A-α-(p-methoxyphenyl) - 2 - (benzylamino)cyclohexanemethanol hydrochloride of melting point 210.5–211° C. after one additional recrystallization from methanol-ether. A sample of this hydrochloride was treated with aqueous sodium hydroxide to give cis-A-α-(p-methoxyphenyl)-2-(benzylamino)cyclohexanemethanol as a free base having a melting point of 86–87° C.

The analysis of the hydrochloride was as follows:

*Analysis.*—Calcd. for $C_{21}H_{27}NO_2 \cdot HCl$: C, 69.69; H, 7.80; N, 3.87; Cl, 9.80. Found: C, 68.18; H, 7.86; N, 3.87; Cl, 9.80.

PREPARATION 23

Cis-α-(3,4,5-trimethoxyphenyl)-2-(benzylamino)cyclohexanemethanol and its hydrochloride A mixture of 83 g. (0.287 mole) of 2-(3,4,5-trimethoxybenzoyl)cyclohexanone and 31 g. (0.29 mole) of benzylamine in 500 ml. of benzene was heated at reflux for a period of 1.5 hours. A total of 7.5 ml. of water was collected in a trap. The reaction mixture was thereupon concentrated in vacuo to give a residue which was dissolved in 500 ml. of ethanol and hydrogenated in the presence of 3.0 g. of platinum oxide catalyst for a period of 20 hours at a hydrogen pressure of 15 to 30 p.s.i. The reaction mixture was thereupon filtered to remove the catalyst and to the filtrate was added 3.0 g. of 10% palladium-on-carbon catalyst and the hydrogenation continued for another period of 24 hours at 20–30 p.s.i. The reaction mixture was filtered, concentrated in vacuo and the resulting residue taken up in 750 ml. of ether and 600 ml. of 10% aqueous hydrochloric acid. This mixture was stirred for 1 hour, after which an acid layer separated. The acid layer was filtered and basified with 20% aqueous sodium hydroxide solution producing an oil which separated from the mixture. The oil was extracted into methylene chloride, which was washed with water, saturated sodium chloride solution and dried over anhydrous magnesium sulfate. The dried solution was evaporated, leaving a gum which gave with ethereal hydrogen chloride a white solid hydrochloride. This acid addition salt was recrystallized from methanol-ether to give 63 g. of impure cis - α - (3,4,5 - trimethoxyphenyl) - 2 - (benzylamino)cyclohexanemethanol hydrochloride of melting point 192–195° C. (previous sintering). After another recrystallization of a 20 g. sample from methanol-ether, the melting point was raised to 197–199° C. (previous sintering).

This latter material was treated with aqueous sodium hydroxide to give the free base which was extracted with methylene chloride and the extract evaporated to give 13.75 g. of a gum-like material. An oxalate of this material was prepared and recrystallized from isopropanol to give 12.3 g. of melting point 208–209° C. The oxalate (12 g.) was treated with aqueous sodium hydroxide to give 9.92 g. of gummy material which partially solidified on standing and was crystallized from Skellysolve B hexanes to give 3.1 g. of cis-α-(3,4,5-trimethoxyphenyl)-2-(benzylamino)cyclohexanemethanol of melting point 113–115° C. and a second crop of 1.33 g. of the same material. Recrystallization of this material gave pure cis-α - (3,4,5 - trimethoxyphenyl) - 2 - (benzylamino)cyclohexanemethanol of melting point 114–115° C.

*Analysis.*—Calcd. for $C_{23}H_{31}NO_4$: C, 71.66; H, 8.11; N, 3.63. Found: C, 71.60; H, 8.19; N, 3.95. Ultraviolet: $\lambda_{max.}$ 235 (7,270); 258 (667); 267 (810); 279 (459).

PREPARATION 24

α-(3,4,5-trimethoxyphenyl)-2-(butylamino)cyclopentanemethanol

In the manner given in Preparation 20, 2-(3,4,5-trimethoxybenzoyl)cyclopentanone was refluxed with butylamine in benzene; and the resulting product was hydrogenated in the presence of platinum oxide catalyst only to give α-(3,4,5-trimethoxyphenyl)-2-(butylamino)cyclopentanemethanol.

PREPARATION 25

α-(3,4,5-trimethoxyphenyl)-2-(hexylamino)cycloheptanemethanol

In the manner given in Preparation 20, 2-(3,4,5-trimethoxybenzoyl)cycloheptanone was refluxed with hexylamine in benzene; and the resulting product was hydrogenated in the presence of platinum oxide catalyst only to give α-(3,4,5-trimethoxyphenyl)-2-(hexylamino)cycloheptanemethanol.

PREPARATION 26

α-(p-Ethoxyphenyl)-2-(ethylamino)cyclohexanemethanol

In the manner given in Preparation 20, 2-(p-ethoxybenzoyl)cyclohexanone was refluxed with N-ethylbenzylamine in benzene; and the resulting product was hydrogenated first in the presence of platinum oxide catalyst and then in the presence of palladium-on-carbon catalyst to give α-(p-ethoxyphenyl)-2-(ethylamino)cyclohexanemethanol.

PREPARATION 27

α-(o-Methoxyphenyl)-2-(3-methoxypropylamino)cyclohexanemethanol

In the manner given in Preparation 20, 2-(o-methoxybenzoyl)-cyclohexanone was refluxed with 3-methoxypropylamine in benzene; and the resulting product was hydrogenated in the presence of platinum oxide catalyst only to give α-(o-methoxyphenyl)-2-(3-methoxypropylamino)cyclohexanemethanol.

PREPARATION 28

α-(2-methoxy-4-methylphenyl)-2-anilinocyclohexanemethanol

In the manner given in Preparation 20, 2-(2-methoxy-4-methylbenzoyl)cyclohexanone was refluxed with N-benzylaniline in benzene; and the resulting product was hydrogenated first in the presence of platinum oxide catalyst and then in the presence of palladium-on-carbon catalyst to give α-(2-methoxy-4-methylphenyl)-2-anilinocyclohexanemethanol.

PREPARATION 29

α-(3,5-dimethyl-4-methoxylphenyl)-2-(propylamino)-cyclohexanemethanol

In the manner given in Preparation 20, 2-(3,5-dimethyl-4-methoxybenzoyl)cyclohexanone was refluxed with N-propylbenzylamine in benzene; and the resulting product was hydrogenated first in the presence of platinum oxide catalyst and then in the presence of palladium-on-carbon catalyst to give α-(3,5-dimethyl-4-methoxyphenyl)-2-(propylamino)cyclohexanemethanol.

PREPARATION 30

α-(p-Trifluoromethylphenyl)-2-(pentylamino)cyclohexanemethanol

In the manner given in Preparation 20, 2-(p-trifluoromethylbenzoyl)cyclohexanone was refluxed with pentylamine in benzene; and the resulting product was hydrogenated in the presence of platinum oxide catalyst only to give α-(p - trifluoromethylphenyl)-2-(pentylamino)cyclohexanemethanol.

PREPARATION 31

α-(p-Chlorophenyl)-2-(isopropylamino)cyclohexanemethanol

In the manner given in Preparation 20, 2-(p-chlorobenzoyl)cyclohexanone was refluxed with N-isopropylbenzylamine in benzene; and the resulting product was hydrogenated first in the presence of platinum oxide catalyst and then in the presence of palladium-on-carbon catalyst to give α-(p-chlorophenyl)-2-(isopropylamino)cyclohexanemethanol.

PREPARATION 32

α-(o-Methylphenyl)-2-aminocyclohexanemethanol

In the manner given in Preparation 20, 2-(o-methylbenzoyl)cyclohexanone was refluxed with benzylamine in benzene; and the resulting product was hydrogenated first in the presence of PtO₂ catalyst and then in the presence of palladium-on-carbon catalyst to give α-(o-methylphenyl)-2-aminocyclohexanemethanol.

PREPARATION 33

α-(p-Methylphenyl)-2-(ethylamino)
cyclohexanemethanol

In the manner given in Preparation 20, 2-(p-methylbenzoyl)cyclohexanone was refluxed with N-ethylbenzylamine in benzene; and the resulting product was hydrogenated in the presence of platinum oxide catalyst and then in the presence of palladium-on-carbon catalyst to give α-(p-methylphenyl) - 2 - (ethylamino)cyclohexanemethanol.

PREPARATION 34

α-(2,4-dimethylphenyl)-2-(p-toluidino)
cyclohexanemethanol

In the manner given in Preparation 20, 2-(2,4-dimethylbenzoyl)cyclohexanone was refluxed with p-toluidine in benzene; and the resulting product was hydrogenated in the presence of platinum oxide catalyst only to give α-(2,4-dimethylphenyl)-2-(p-toluidino)cyclohexanemethanol.

PREPARATION 35

α-(2-methoxy-4-methylphenyl)-2-(2-ethoxyethylamino)cyclohexanemethanol

In the manner given in Preparation 20, 2-(2-methoxy-4-methylbenzoyl)cyclohexanone was refluxed with 2-ethoxyethylamine in benzene; and the resulting product was hydrogenated in the presence of platinum oxide catalyst only to give α-(2-methoxy-4-methylphenyl)-2-(2-ethoxyethylamino)cyclohexanemethanol.

PREPARATION 36

α-(p-Ethoxyphenyl)-2-(methylamino)
cyclooctanemethanol

In the manner given in Preparation 20, 2-(p-ethoxybenzoyl)cyclooctanone was refluxed with N-methylbenzylamine in benzene; and the resulting product was hydrogenated first in the presence of platinum oxide catalyst and then in the presence of palladium-on-carbon catalyst to give α-(p-ethoxyphenyl) - 2 - (methylamino)cyclooctanemethanol.

PREPARATION 37

α-(p-Bromophenyl)-2-(isobutylamino)
cyclooctanemethanol

In the manner given in Preparation 20, 2-(p-bromobenzoyl)cyclooctanone was refluxed with isobutylamine in benzene; and the resulting product was hydrogenated in the presence of platinum oxide catalyst only to give α-(p-bromophenyl) - 2 - (isobutylamino)cyclooctanemethanol.

PREPARATION 38

α-(m-Methylphenyl)-2-(o-toluidino)
cyclooctanemethanol

In the manner given in Preparation 20, 2-(m-methylbenzoyl)cyclooctanone was refluxed with o-toluidine in benzene; and the resulting product was hydrogenated in the presence of platinum oxide catalyst only to give α-(m-methylphenyl)-2-(o-toluidino)cyclooctanemethanol.

PREPARATION 39

α-(p-Fluorophenyl)-2-aminocyclohexanemethanol

In the manner given in Preparation 20, 2-(p-fluorobenzoyl)cyclohexanone was refluxed with benzylamine in benzene; and the resulting product was hydrogenated first in the presence of platinum oxide catalyst and then in the presence of palladium-on-carbon catalyst to give α-(p-fluorophenyl)-2-aminocyclohexanemethanol.

PREPARATION 40

α-(2,5-diiodophenyl)-2-(methylamino)
cycloheptanemethanol

In the manner given in Preparation 20, 2-(2,5-diiodobenzoyl)cycloheptanone was refluxed with N-methylbenzylamine in benzene; and the resulting product was hydrogenated first in the presence of platinum oxide catalyst and then in the presence of palladium-on-carbon catalyst to give α-(2,5-diiodophenyl)-2-(methylamino)cycloheptanemethanol.

PREPARATION 41

α-(p-Bromophenyl)-2-(ethylamino)
cyclopentanemethanol

In the manner given in Preparation 20, 2-(p-bromobenzoyl)cyclopentanone was refluxed with N-ethylbenzylamine in benzene; and the resulting product was hydrogenated first in the presence of platinum oxide catalyst and then in the presence of palladium-on-carbon catalyst to give α-(p-bromophenyl)-2-(ethylamino)cyclopentanemethanol.

PREPARATION 42

α-(p-Hexylphenyl)-2-(4-ethoxybutylamino)
cyclopentanemethanol

In the manner given in Preparation 20, 2-(p-hexylbenzoyl)cyclopentanone was refluxed with 4-ethoxybutylamine in benzene; and the resulting product was hydrogenated in the presence of platinum oxide catalyst only to give α-(p-hexylphenyl)-2-(4-ethoxybutylamino)cyclopentanemethanol.

PREPARATION 43

α-(2,4-diiodophenyl)-2-(ethylamino)
cycloheptanemethanol

In the manner given in Preparation 20, 2-(2,4-diiodobenzoyl)cycloheptanone was refluxed with N-ethylbenzylamine in benzene; and the resulting product was hydrogenated first in the presence of platinum oxide catalyst and then in the presence of palladium-on-carbon catalyst to give α-(2,4-diiodophenyl)-2-(ethylamino)cycloheptanemethanol.

PREPARATION 44

α-(p-Methoxyphenyl)-2-(p-methoxyanilino)cyclohexanemethanol

In the manner given in Preparation 20, 2-(p-methoxybenzoyl)-cyclohexanone was refluxed with p-anisidine in benzene in the presence of p-toluenesulfonic acid; the resulting product was hydrogenated in the presence of platinum oxide catalyst only to give α-(p-methoxyphenyl)-2-(p - methoxyanilino)cyclohexanamethanol of melting point 125–126° C. Ultraviolet: $\lambda_{max}$. 228 (16,750); 245.5 (13,150); sh. 275 (2,400); 282 (2,150); 309 (2,400).

Analysis.—Calcd. for $C_{21}H_{27}NO_3$: C, 73.87; H, 7.97; N, 4.10. Found: C, 73.55; H, 7.98; N, 4.18.

PREPARATION 45

α-(p-Methoxyphenyl)-2-(cyclohexylamino)cyclohexanemethanol

In the manner given in Preparation 20, 2-(p-methoxybenzoyl)-cyclohexanone was refluxed with cyclohexylamine in benzene in the presence of p-toluenesulfonic acid; the resulting product was hydrogenated in the presence of platinum oxide catalyst only to give as an oily product, α-(p-methoxyphenyl) - 2 - (cyclohexylamino)cyclohexanemethanol.

PREPARATION 46

*α-(p-Methoxyphenyl)-2-anilinocyclohexanemethanol*

In the manner given in Preparation 20, 2-(p-methoxybenzoyl)-cyclohexanone was refluxed with aniline in benzene in the presence of p-toluenesulfonic acid; the resulting product was hydrogenated in the presence of platinum oxide catalyst only, to give α-(p-methoxyphenyl)-2-anilinocyclohexanemethanol of melting point 107–108° C.

*Analysis.*—Calcd. for $C_{20}H_{25}NO_2$: C, 77.13; H, 8.09; N, 4.50. Found: C, 77.12; H, 7.88; N, 4.52.

In the manner given in Preparation 20, other 1,3-amino alcohols are obtained such as:

α-(p-butoxyphenyl)-2-(methylamino)cyclopentanemethanol;
α-(p-isopropylphenyl)-2-(ethylamino)cyclopentanemethanol;
α-(m-trifluoromethylphenyl)-2-(butylamino)cyclopentanemethanol;
α-(2,4-diiodophenyl)-2-(3-ethoxypropylamino)cyclopentanemethanol;
α-(p-fluorophenyl)-2-(m-toluidino)cyclopentanemethanol;
α-(p-isopropoxyphenyl)-2-anilinocyclohexanemethanol;
α-(p-pentylphenyl)-2-(hexylamino)cyclohexanemethanol;
α-(2,3-diethylphenyl)-2-(2-methoxyethylamino)cyclohexanemethanol;
α-(2,4-diethoxyphenyl)-2-aminocyclohexanemethanol;
α-(3,4,5-triethoxyphenyl)-2-(ethylamino)cycloheptanemethanol;
α-(2-chlorophenyl)-2-(o-toluidino)cycloheptanemethanol;
α-(2,4-dichlorophenyl)-2-(4-ethoxybutylamino)cycloheptanemethanol;
α-(p-trifluoromethylphenyl)-2-(propylamino)cycloheptanemethanol;
α-(2,4-diethoxyphenyl)-2-(isobutylamino)cyclooctanemethanol;
α-(o-fluorophenyl)-2-(hexylamino)cyclooctanemethanol;
α-(p-methoxyphenyl)-2-aminocyclooctanemethanol;
α-(p-butoxyphenyl)-2-anilinocyclooctanemethanol;
and the like.

PREPARATION 47

*Cis-A-α-(p-methoxyphenyl)-2-aminocyclohexane methanol and its hydrochloride*

(1) A suspension of 8.0 g. (0.0221 mole) of cis-A-α-(p - methoxyphenyl) - 2 - (benzylamino)cyclohexanemethanol hydrochloride in 150 ml. of ethanol was hydrogenated in the presence of 1 g. of 10% palladium-on-carbon catalyst over a period of 24 hours at a pressure of 28–52 p.s.i. The mixture was then filtered, thereby eliminating catalyst, the filtrate was concentrated in vacuo and the residue recrystallized from isopropanol-ether to give 4.32 g. (72%) of cis-A-α-(p-methoxyphenyl)-2-aminocyclohexanemethanol hydrochloride of melting point 202–203° C.

The hydrochloride was treated with aqueous sodium hydroxide, the mixture extracted with methylene chloride, the methylene chloride extracts washed with aqueous sodium chloride and thereupon evaporated to give the free base, cis-A-α-(p-methoxyphenyl) - 2 - aminocyclohexanemethanol of melting point 86–87° C.

Similarly, a suspension of 20 g. of the free base, cis-A-α - (p-methoxyphenyl) - 2 - (benzylamino)cyclohexanemethanol in 1 l. of ethanol was hydrogenated in the presence of 3 g. of 10% palladium-on-carbon catalyst for a period of 32 hours at a hydrogen pressure of 25–30 p.s.i. at room temperature. The reaction mixture was thereupon filtered and the filtrate was concentrated in vacuo to give a residue which was taken up in ether. The ether extract was evaporated and the resulting residue was recrystallized from Skellysolve B hexanes several times to give cis-A-α-(p-methoxyphenyl)-2-aminocyclohexanemethanol of melting point 86–88° C.

*Analysis.*—Calcd. for $C_{14}H_{21}NO_2$: C, 71.45; H, 9.00; N, 5.95. Found: C, 71.20; H, 9.00; N, 5.88.

(2) The preparation of cis-A-α-(p-methoxyphenyl)-2-aminocyclohexanemethanol can be carried out without the isolation of a benzylamino derivative in the following manner:

Twenty-three grams of 2-(p-methoxybenzoyl)cyclohexanone was reacted with 11 g. of benzylamine in 150 ml. of benzene, and the benzene was removed under reduced pressure. The residue so obtained was dissolved in 150 ml. of ethanol and reduced in the presence of platinum oxide catalyst. The mixture was thereupon filtered, and to the filtrate was added 2 g. of 10% palladium-on-carbon catalyst, whereupon the mixture was hydrogenated for 24 hours at 35–50 p.s.i. Thereafter the mixture was again filtered, the filtrate evaporated in vacuo and the residue taken up with 200 ml. of 10% aqueous acetic acid and 250 ml. of ether. The acetic acid layer was separated and combined with a 50-ml. water extract of the ether layer. The combined acetic acid layer and water extract was basified with 20% aqueous sodium hydroxide solution and extracted with methylene chloride. The methylene chloride extracts were washed with water, saturated sodium chloride solution, dried over anhydrous magnesium sulfate and evaporated in vacuo to give a residue. This residue was recrystallized from ether-Skellysolve B hexanes to give 15.8 g. (67%) of cis-A-α-(p-methoxyphenyl) - 2 - aminocyclohexanemethanol of melting point 85–87° C.

PREPARATION 48

*Cis-B-α-(p-methoxyphenyl)-2-aminocyclohexanemethanol and its oxalate*

Twenty ml. of trifluoroacetic acid was cooled to 0–5° C. and thereto was added 2.35 g. (0.01 mole) of cis-A-α-(p-methoxyphenyl) - 2 - aminocyclohexanemethanol in one portion. The ice bath used for cooling was removed and the greenish solution was stirred for 46 minutes. The reaction mixture was thereupon cooled in an ice bath, 20 g. of ice, 50 ml. of water and 50 ml. of 20% aqueous sodium hydroxide solution were added and the mixture was stirred for 45 minutes. The mixture thereupon was extracted with methylene chloride, the extract was washed with water, saturated sodium chloride solution, and dried over anhydrous magnesium sulfate. The dried solution was evaporated to give 2.45 g. of a gummy material which according to vapor-phase chromatography contained six components ranging from 1.25% to 42.77%.

The gum-like material was reacted with oxalic acid in ether, the mixture was filtered and the salt thus obtained was suspended in 200 ml. of methyl ethyl ketone. The methyl ethyl ketone suspension was warmed on the steam bath for about 5 minutes and filtered to give 1.5 g. of a white solid which was recrystallized from methanol-ether to give 1.424 g. (44%) of cis-B-α-(p-methoxyphenyl)-2-aminocyclohexanemethanol oxalate of melting point 178–179° C.

The oxalate (1.3 g.) was converted to the free base by dissolving the salt in methanol and adding excess sodium methoxide in methanol. The mixture was diluted with water, and extracted several times with methylene chloride. The methylene chloride extract was washed with saturated sodium chloride solution, dried over anhydrous magnesium sulfate and evaporated to give 1.03 g. of an oil which after trituration with pentane gave a solid. Recrystallization of this product from Skellysolve B hexanes gave 0.43 g. of cis-B-α-(p-methoxyphenyl)-2-aminocyclohexanemethanol melting at 86–87° C.

*Analysis.*—Calcd. for $C_{14}H_{21}NO_2$: C, 71.45; H, 9.00; N, 5.95. Found: C, 77.90; H, 8.93; N, 5.89. Ultraviolet: $\lambda_{max}$. 225 (11,600); 274 (1,550); 281 (1,300).

PREPARATION 49

*Cis-A-α-(o-methoxyphenyl)-2-aminocyclohexanemethanol*

A mixture of 23 g. (0.099 mole) of 2-(o-methoxybenzoyl)-cyclohexanone and 11 g. (0.103 mole) of benzylamine in 150 ml. of benzene was heated at reflux for 1.5 hours using a water trap (Dean-Stark). A total of 1.5 ml. of water was collected. The mixture was thereupon evaporated in vacuo, and the resulting residue was dissolved in 150 ml. of ethanol and hydrogenated in the presence of 1.5 g. of platinum oxide catalyst for a period of 24 hours at a pressure of 20–50 p.s.i. During this time about 1.6 molar equivalents of hydrogen was absorbed. The reaction mixture was thereupon filtered to remove the catalyst, 1.5 g. of 10% palladium-on-carbon catalyst was added to the filtrate and the mixture was then hydrogenated for 24 hours at a hydrogen pressure between 40–50 p.s.i. The resulting mixture was filtered, and the filtrate was evaporated to give an oily material which was taken up with a mixture of 400 ml. of aqueous 10% acetic acid and 500 ml. of ether-methylene chloride (1:1). The acetic acid layer was separated, basified with 20% aqueous sodium hydroxide solution whereupon an oil separated which was extracted with methylene chloride. The methylene chloride extracts were washed with water, saturated aqueous sodium chloride solution and finally dried over anhydrous sodium sulfate. Evaporation of the solution resulted in a solid which was recrystallized from ether-Skellysolve B hexanes several times to give cis-A-α-(o-methoxyphenyl)-2-aminocyclohexanemethanol of melting point 122–123° C.

*Analysis.*—Calcd. for $C_{14}H_{21}NO_2$: C, 71.45; H, 9.00; N, 5.95. Found: C, 71.59; H, 9.15; N, 6.31. Ultraviolet: $\lambda_{max}$. 216 (8,450); 272 (2,150); 278 (2,000).

PREPARATION 50

*Cis-α-(3,4,5-trimethoxyphenyl)-2-aminocyclohexanemethanol and its hydrochloride*

Three grams of cis-α-(3,4,5-trimethoxyphenyl)-2-(benzylamino)cyclohexanemethanol in 150 ml. of ethanol was hydrogenated in the presence of 1 g. of 10% palladium-on-carbon catalyst for a period of 6.5 hours at a pressure of 46–49 p.s.i. The reaction mixture was then filtered, the filtrate evaporated in vacuo, the residue dissolved in ether, filtered again, and the filtrate was admixed with an ethereal solution of hydrogen chloride. The hydrochloride salt precipitated and was collected on a filter and recrystallized from methanol-ether to give 1.47 g. of cis-α-(3,4,5-trimethoxyphenyl)-2-aminocyclohexanemethanol hydrochloride of melting point 234° C.

*Analysis.*—Calcd. for $C_{16}H_{25}NO_4 \cdot HCl$: C, 57.81; H, 7.90; N, 4.22; Cl, 10.69. Found: C, 58.11; H, 8.24; N, 4.24; Cl, 10.76. Ultraviolet: $\lambda_{max}$. sh. 232 (7,250); 268 (790); 278 (604). Treatment of this hydrochloride with sodium hydroxide in water produced the free base which was extracted with methylene chloride and isolated by evaporation of the extracts. Recrystallization gave pure cis - α - (3,4,5-trimethoxyphenyl) - 2 - aminocyclohexanemethanol.

PREPARATION 51

α(*p-Ethoxyphenyl*)-*2-aminocyclohexanemethanol*

In the manner given in Preparation 47, (Part 2), 2-(p-ethoxybenzoyl)cyclohexanone was treated with benzylamine; the resulting product was hydrogenated consecutively in the presence of platinum oxide catalyst and then in the presence of palladium-on-carbon catalyst to give α-(p-ethoxyphenyl)-2-aminocyclohexanemethanol.

PREPARATION 52

α-(*3,4,5-trimethoxyphenyl*)-*2-aminocyclopentanemethanol*

In the manner given in Preparation 47 (Part 2), 2-(3,4,5-trimethoxybenzyl)cyclopentanone was treated with benzylamine; the resulting product was hydrogenated consecutively in the presence of platinum oxide catalyst and then in the presence of palladium-on-carbon catalyst to give α - (3,4,5-trimethoxyphenyl) - 2 - aminocyclopentanemethanol.

PREPARATION 53

α-(*3,4,5-trimethoxyphenyl*)-*2-aminocycloheptanemethanol*

In the manner given in Preparation 47 (Part 2,) 2-(3,4,5-trimethoxybenzoyl)cycloheptanone was treated with benzylamine; the resulting product was hydrogenated consectuively in the presence of platinum oxide catalyst and then in the presence of palladium-on-carbon catalyst to give α-(3,4,5-trimethoxyphenyl)-2-aminocycloheptanemethanol.

PREPARATION 54

α-(*p-Methoxyphenyl*)-*2-aminocyclopentanemethanol*

In the manner given in Preparation 47 (Part 2), 2-(p-methoxybenzoyl)cyclopentanone was treated with benzylamine; the resulting product was hydrogenated consecutively in the presence of platinum oxide catalyst and then in the presence of palladium-on-carbon catalyst to give α-(p-methoxyphenyl)-2-aminocyclopentanemethanol.

PREPARATION 55

α-(*2-methoxy-4-methylphenyl*)-*2-aminocyclohexanemethanol*

In the manner given in Preparation 47 (Part 2), 2-(2-methoxy-4-methylbenzoyl)cyclohexanone was treated with benzylamine; the resulting product was hydrogenated consecutively in the presence of platinum oxide catalyst and then in the presence of palladium-on-carbon catalyst to give α-(2-methoxy-4-methylphenyl)-2-aminocyclohexanemethanol.

PREPARATION 56

α-(*3,5-dimethyl-4-methoxyphenyl*)-*2-aminocyclohexanemethanol*

In the manner given in Preparation 47 (Part 2), 2-(3,5-dimethyl-4-methoxybenzoyl)cyclohexanone was treated with benzylamine; the resulting product was hydrogenated consecutively in the presence of platinum oxide catalyst and then in the presence of palladium-on-carbon catalyst to give α-(3,5-dimethyl-4-methoxyphenyl)-2-aminocyclohexanemethanol.

PREPARATION 57

α-(*p-Trifluoromethylphenyl*)-*2-aminocyclohexanemethanol*

In the manner given in Preparation 47 (Part 2), 2-(p-trifluoromethylbenzoyl)cyclohexanone was treated with benzylamine; the resulting product was hydrogenated consecutively in the presence of platinum oxide catalyst and then in the presence of palladium-on-carbon catalyst to give α - (p-trifluoromethylphenyl) - 2 - aminocyclohexanemethanol.

PREPARATION 58

α-(*p-Chlorophenyl*)-*2-aminocyclohexanemethanol*

In the manner given in Preparation 47 (Part 2), 2-(p-chlorobenzoyl)cyclohexanone was treated with benzylamine; the resulting product was hydrogenated consecutively in the presence of platinum oxide catalyst and then in the presence of palladium-on-carbon catalyst to give α-(p-chlorophenyl)-2-aminocyclohexanemethanol.

PREPARATION 59

α-(p-Ethoxyphenyl)-2-aminocyclooctanemethanol

In the manner given in Preparation 47 (Part 2), 2-(p-ethoxybenzoyl)cyclooctanone was treated with benzylamine; the resulting product was hydrogenated consecutively in the presence of platinum oxide catalyst and then in the presence of palladium-on-carbon catalyst to give α-(p-ethoxyphenyl)-2-aminocyclooctanemethanol.

PREPARATION 60

α-(2,3,4-trimethoxyphenyl)-2-aminocyclooctanemethanol

In the manner given in Preparation 47 (Part 2), 2-(2,3,4-trimethoxybenzoyl)cyclooctanone was treated with benzylamine; the resulting product was hydrogenated consecutively in the presence of platinum oxide catalyst and then in the presence of palladium-on-carbon catalyst to give α-(2,3,4-trimethoxyphenyl) - 2 - aminocyclooctanemethanol.

In the manner given in Preparation 47, other α-phenyl-2-aminocycloalkanemethanols are prepared such as:

α-(2,4-dimethylphenyl)-2-aminocyclohexanemethanol;
α-(p-bromophenyl)-2-aminocyclohexanemethanol;
α-(p-iodophenyl)-2-aminocyclohexanemethanol;
α-(p-fluorophenyl)-2-aminocyclohexanemethanol;
α-(2,5-diiodophenyl)-2-aminocyclohexanemethanol;
α-(p-isopropoxyphenyl)-2-aminocyclohexanemethanol;
α-(p-pentylphenyl)-2-aminocyclohexanemethanol;
α-(2,4-diethoxyphenyl)-2-aminocyclohexanemethanol;
α-(o-bromophenyl)-2-aminocyclohexanemethanol;
α-(p-hexylphenyl)-2-aminocyclopentanemethanol;
α-(p-butoxyphenyl)-2-aminocyclopentanemethanol;
α-(p-isopropylphenyl)-2-aminocyclopentanemethanol;
α-(m-trifluoromethylphenyl)-2-aminocyclopentanemethanol;
α-(2,4-diiodophenyl)-2-aminocyclopentanemethanol;
α-(p-fluorophenyl)-2-aminocyclopentanemethanol;
α-(p-bromophenyl)-2-aminocyclopentanemethanol;
α-(2,5-diiodophenyl)-2-aminocycloheptanemethanol;
α-(3,4-dipropylphenyl)-2-aminocycloheptanemethanol;
α-(3,4,5-triethoxyphenyl)-2-aminocycloheptanemethanol;
α-(o-chlorophenyl)-2-aminocycloheptanemethanol;
α-(2,4-dichlorophenyl)-2-aminocycloheptanemethanol;
α-(p-trifluoromethylphenyl)-2-aminocycloheptanemethanol;
α-(p-iodophenyl)-2-aminocycloheptanemethanol;
α-(m-methylphenyl)-2-aminocyclooctanemethanol;
α-(p-ethoxyphenyl)-2-aminocyclooctanemethanol;
α-(p-bromophenyl)-2-aminocyclooctanemethanol;
α-(2,4-diethoxyphenyl)-2-aminocyclooctanemethanol;
α-(o-fluorophenyl)-2-aminocyclooctanemethanol;
α-(p-methoxyphenyl)-2-aminocyclooctanemethanol;
α-(p-butoxyphenyl)-2-aminocyclooctanemethanol;
α-(3,5-dipropylphenyl)-2-aminocyclooctanemethanol;
and the like.

EXAMPLE 1

Cis-A-octahydro-4-(p-methoxyphenyl)-1-methyl-2H-cyclohex[d][1,3]oxazine

A mixture of 2.5 g. (0.01 mole) of cis-A-α-(p-methoxyphenyl) - 2 - (methylamino)cyclohexanemethanol and 0.60 g. (0.02 mole) of paraformaldehyde in 150 ml. of benzene was heated at reflux for 20 hours, using an extraction thimble containing 5 g. of crystalline aluminum silicate of Formula $Na_{12}[(AlO_2)_{12}(SiO_2)_{12}]$ [Linde molecular sieve No. 4A; see also molecular sieves Linde Co., E. MERCK INDEX, Merck & Co., Inc., Rahway. N.J., U.S.A., (1960) p. 1592]. Thereafter, the reaction mixture was concentrated in vacuo to give a residue which was taken up with 25 ml. of methylene chloride which was poured onto a column containing 25 g. of silica. The column was then eluted with 100 ml. of methylene chloride in one portion, which upon evaporation gave 0.29 g. of oily material. The column was then eluted with 150 ml. of a mixture of 10% methanol–90% methylene chloride (by volume), which upon concentration gave 2.48 g. of oil. This oil was distilled in an oil-jacketed flask at 0.5–0.6 mm. Hg, giving 2.26 g. of an oil of boiling point 162–170° C. at 0.5–0.6 mm. pressure. Ultraviolet: $\lambda_{max.}$ 226 (11,900); 268 sl. sh.; 276 (1,600); 283 (1,300).

*Analysis*.—Calcd. for $C_{16}H_{23}NO_2$: C, 73.53; H, 8.87; N, 5.36. Found: C, 73.61; H, 8.97; N, 5.23.

Vapor phase chromatography indicated that the obtained cis - A - octahydro-4-(p-methoxyphenyl)-1-methyl-2H-cyclohex[d][1,3]-oxazine was 98.25% pure.

EXAMPLE 2

Cis-A-octahydro-4-(p-methoxyphenyl)-1-methyl-2-phenyl-2H-cyclohex[d][1,3]oxazine A solution of 2.5 g. (0.01 mole) of cis-A-α-(p-methoxyphenyl) - 2 - (methylamino)cyclohexanemethanol and 10 g. of benzaldehyde in 150 ml. of benzene was heated at reflux for 17 hours, using an extraction thimble containing 10 g. of the aluminum silicate used in Example 1. After the reaction was completed, the mixture was concentrated in vacuo to give an oil which was dissolved in the minimum amount necessary of Skellysolve B hexanes and poured over a column containing 100 g. of silica and packed with Skellysolve B hexanes. The column was eluted in succession with 500 ml. of Skellysolve B hexanes which removed most of the excess of benzaldehyde, then eluted with 1.2 l. of methylene chloride. Those methylene chloride fractions which containing solids were combined and evaporated. The solid residue was triturated with pentane and filtered to obtain 1.56 g. of cis-A-octahydro - 4 - (p-methoxyphenyl)-1-methyl-2-phenyl-2H-cyclohex[d][1,3]oxazine, of melting point 117–118° C. The column was then eluted with 500 ml. of methanol. The methanol solution was concentrated in vacuo, and the residue taken up into ether and aqueous sodium carbonate solution. The organic layer was separated, washed with saturated sodium chloride solution, dried over anhydrous magnesium sulfate and evaporated to a solid which was triturated repeatedly with pentane, to give an additional 0.432 g. of cis-A-octahydro-4-(p-methoxyphenyl) - 1-methyl-2-phenyl-2H-cyclohex[d][1,3]oxazine of melting point 115–117° C. This product after recrystallization from isopropanol gave an analytically pure sample, melting point 113–114° C., of cis-A-octahydro-4 - (p - methoxyphenyl)-1-methyl-2-phenyl-2H-cyclohex[d][1,3]oxazine. Ultraviolet: $\lambda_{max.}$ 224 (13,250); sh. 252; sl. sh. 258; sl. sh. 264; sl. sh. 268; 276 (1,550); 283 (1,300).

*Analysis*.—Calcd. for $C_{22}H_{27}NO_2$: C, 78.30; H, 8.07; N, 4.15. Found: C, 78.24; H, 8.22; N, 4.23.

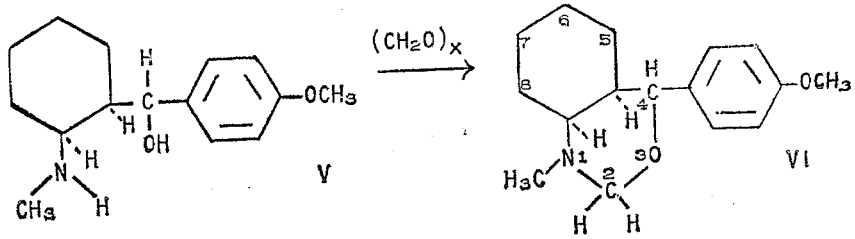

Example 3

Cis-B-octahydro-4-(p-methoxyphenyl)-1-methyl-2H-cyclohex[d][1,3]oxazine

In the manner given in Example 1, 2.5 g. of cis-B-α-(p - methoxyphenyl) - 2 - (methylamino)cyclohexanemethanol was reacted with 0.60 g. of paraformaldehyde in 150 ml. of benzene at reflux temperature for 15 hours, using an extraction thimble containing 5 g. of the aluminum silicate as used in Example 1. The resulting material was recovered by concentrating the reaction mixture and chromatographing the product over 100 g. of silica with methylene chloride. The column was first eluted with 750 ml. of methylene chloride, then with 250 ml. of 2% methanol–98% methylene chloride and then with 750 ml. of 4% methanol–96% methylene chloride. The last fraction, 4% methanol–96% methylene chloride, was combined and distilled giving at 0.5 mm. Hg pressure, 0.90 g. of an oil boiling at 165–170° C. This oil was found to be 98.8% pure cis-B-octahydro-4-(p-methoxyphenyl)-1-methyl-2H-cyclohex[d][1,3]oxazine by vapor phase chromatography. Ultraviolet: $\lambda_{max}$. 226 (12,700); 268 sl. sh.; 274 (1,500); 281 (1,300).

*Analysis.*—Calcd. for $C_{16}H_{23}NO_2$: C, 73.53; H, 8.87, N, 5.36. Found: C, 73.00; H, 8.59; N, 5.70.

Example 4

Cis-B-octahydro-4-(p-methoxyphenyl)-1-methyl-2-phenyl-2H-cyclohex[d][1,3]oxazine A solution of 5.3 g. of cis-B-α-(p-methoxyphenyl)-2-(methylamino)cyclohexanemethanol, 20 g. of benzaldehyde and 150 ml. of benzene was heated at reflux for 16 hours using an extraction thimble containing 20 g. of aluminum silicate [Linde molecular sieve No. 4A, as in Example 1]. The reaction mixture was thereupon evaporated in vacuo, the residue taken up into 200 ml. of ether, and the ether layer extracted with 10% aqueous acetic acid in four 50 ml. fractions. The acetic acid extracts were combined, basified with 20% aqueous sodium hydroxide solution, whereupon an oil separated. This oil was extracted into methylene chloride, the methylene chloride extract was washed with water, saturated aqueous sodium chloride solution and dried over anhydrous magnesium sulfate. After evaporation 2.9 g. of an oil was obtained which solidified upon standing. The solid was recrystallized from isopropanol to give 1.54 g. of material melting at 128–129° C. and a second crop of 0.08 g. melting at 126–128° C. The total yield of 1.62 g. (28%) was again recrystallized to give a pure analytical sample of cis - B - octahydro - 4 - (p-methoxyphenyl) - 1 - methyl - 2 - phenyl - 2H - cyclohex[d][1,3]oxazine of melting point 128–129° C.

*Analysis.*—Calcd. for $C_{22}H_{27}NO_2$: C, 78.30; H, 8.07; N, 4.15. Found: C, 78.28; H, 8.41; N, 3.97.

Example 5

Cis-A-octahydro-4-(p-methoxyphenyl)-1,2-dimethyl-2H-cyclohex[d][1,3]oxazine

In the manner given in Example 1, a mixture of cis-A-α - (p - methoxyphenyl) - 2 - (methylamino)cyclohexanemethanol and paraldehyde in benzene solution was heated to reflux to give cis-A-octahydro-4-(p-methoxyphenyl)-1,2-dimethyl-2H-cyclohex[d][1,3]oxazine.

Example 6

Cis-B-octahydro-4-(p-methoxyphenyl)-1,2-dimethyl-2H-cyclohex[d][1,3]oxazine

In the manner given in Example 1, a mixture of cis-B-α -(p - methoxyphenyl) - 2 - (methylamino)cyclohexanemethanol and paraldehyde in benzene solution was heated to reflux to give cis-B-octahydro-4-(p-methoxyphenyl)-1,2-dimethyl-2H-cyclohex[d][1,3]oxazine.

Example 7

Cis-A-octahydro-4-(p-methoxyphenyl)-1-benzyl-2-ethyl-2H-cyclohex[d][1,3]oxazine In the manner given in Example 1, cis-A-α-(p-methoxyphenyl) - 2 - (benzylamino)cyclohexanemethanol and propionaldehyde were heated in benzene solution to give cis - A - octahydro - 4 - (p - methoxyphenyl) - 1 - benzyl - 2-ethyl-2H-cyclohex[d][1,3]oxazine.

Example 8

Cis-A-octahydro-4-(3,4,5-trimethoxyphenyl)-1-benzyl-2-ethyl-2H-cyclohex[d][1,3] oxazine In the manner given in Example 1, cis-A-α-(3,4,5-trimethoxyphenyl) - 2 - (benzylamino)cyclohexanemethanol and propionaldehyde were heated in benzene solution to give cis - A - octahydro - 4 - (3,4,5 - trimethoxyphenyl) - 1-benzyl-2-ethyl-2H-cyclohex[d][1,3]oxazine.

Example 9

Octahydro-4-(3,4,5-trimethoxyphenyl)-1-butyl-2-phenylcyclopent[d][1,3]oxazine In the manner given in Example 1, a mixture of α-(3,4,5 - trimethoxyphenyl) - 2 - (butylamino)cyclopentanemethanol and benzaldehyde in benzene solution was heated to reflux to give octahydro-4-(3,4,5-trimethoxyphenyl)-1-butyl-2-phenylcyclopent[d][1,3]oxazine.

Example 10

Decahydro-4-(3,4,5-trimethoxyphenyl)-1-hexyl-2-phenylcyclohept[d][1,3]oxazine In the manner given in Example 1, a mixture of α-(3,4,5 - trimethoxyphenyl) - 2 - (hexylamino)cycloheptanemethanol and benzaldehyde in benzene solution was heated to reflux to give decahydro-4-(3,4,5-trimethoxyphenyl)-1-hexyl-2-phenylcyclohept[d][1,3]oxazine.

Example 11

Octahydro-4-(p-ethoxyphenyl)-1-ethyl-2-pentyl-2H-cyclohex[d][1,3]oxazine

In the manner given in Example 1, a mixture of α-(p - ethoxyphenyl) - 2 - (ethylamino)cyclohexanemethanol and caproaldehyde in benzene solution was heated to reflux to give octahydro-4-(p-ethoxyphenyl)-1-ethyl-2-pentyl-2H-cyclohex[d][1,3]oxazine.

Example 12

Octahydro-4-(o-methoxyphenyl)-1-(3-methoxypropyl)-2-(m-tolyl)-2H-cyclohex[d][1,3]oxazine In the manner given in Example 1, a mixture of α-(o - methoxyphenyl) - 2 - (3 - methoxypropylamino)cyclohexanemethanol and m-tolualdehyde in benzene solution was heated to reflux to give octahydro-4-(o-methoxyphenyl) - 1 - (3 - methoxypropyl) - 2 - (m - tolyl) - 2H - cyclohex[d][1,3]oxazine.

Example 13

Octahydro-4-(2-methoxy-4-methylphenyl)-1-phenyl-2-butyl-2H-cyclohex[d][1,3]oxazine In the manner given in Example 1, a mixture of α-(2 - methoxy - 4 - methylphenyl) - 2 - anilinocyclohexanemethanol and valeraldehyde in benzene solution was heated to reflux to give octahydro-4-(2-methoxy-4-methylphenyl)-1-phenyl-2-butyl-2H-cyclohex[d][1,3]oxazine.

Example 14

Octahydro-4-(3,5-dimethyl-4-methoxyphenyl)-1-propyl-2-methyl-2H-cyclohex[d][1,3]oxazine In the manner given in Example 1, a mixture of α-(3,5 - dimethyl - 4 - methoxyphenyl) - 2 - (propylamino)cyclohexanemethanol and paraldehyde in benzene solution was heated to reflux to give octahydro-4-(3,5-dimethyl - 4 - methoxyphenyl) - 1 - propyl - 2 - methyl-2H-cyclohex[d][1,3]oxazine.

EXAMPLE 15

*Octahydro-4-(p-trifluoromethylphenyl)-1-pentyl-2-ethyl-2H-cyclohex[d][1,3]oxazine*

In the manner given in Example 1, a mixture of α-(p - trifluoromethylphenyl) - 2 - (pentylamino)cyclohexanemethanol and propionaldehyde in benzene solution was heated to reflux to give octahydro-4-(p-trifluoromethylphenyl) - 1 - pentyl - 2 - ethyl - 2H - cyclohex[d][1,3]oxazine.

EXAMPLE 16

*Octahydro-4-(p-chlorophenyl)-1-isopropyl-2-propyl-2H-cyclohex[d][1,3]oxazine*

In the manner given in Example 1, α-(p-chlorophenyl)-2-(isopropylamino)cyclohexanemethanol and butyraldehyde in benzene solution was heated to reflux to give octahydro - 4 - (p - chlorophenyl) - 1 - isopropyl - 2 - propyl - 2H - cyclohex[d][1,3]oxazine.

EXAMPLE 17

*Octahydro-4-(o-methoxyphenyl)-2-phenyl-2H-cyclohex[d][1,3]oxazine*

In the manner given in Example 1, a mixture of α-(o-methoxyphenyl)-2-aminocyclohexanemethanol and benzaldehyde in benzene solution was heated to reflux to give octahydro - 4 - (o-methoxyphenyl)-2-phenyl-2H-cyclohex[d][1,3]oxazine.

EXAMPLE 18

*Octahydro-4-(p-methoxyphenyl)-1-ethyl-2-(p-tolyl)-2H-cyclohex[d][1,3]oxazine*

In the manner given in Example 1, a mixture of α-(p-methoxyphenyl) - 2 - (ethylamino)cyclohexanemethanol and p-tolualdehyde in benzene solution was heated to reflux to give octahydro-4-(p-methoxyphenyl)-1-ethyl-2-(p-tolyl)-2H-cyclohex[d][1,3]oxazine.

EXAMPLE 19

*Octahydro-4-(2,4-dimethylphenyl)-1-(p-tolyl)-2-(o-tolyl)-2H-cyclohex[d][1,3]oxazine*

In the manner given in Example 1, a mixture of α(2,4-dimethylphenyl) - 2 - (p-toluidino)cyclohexanemethanol and o-tolualdehyde in benzene solution was heated to reflux to give octahydro-4-(2,4-dimethylphenyl)-1-(p-tolyl)-2-(o-tolyl)-2H-cyclohex[d][1,3]oxazine.

EXAMPLE 20

*Octahydro-4-(-2-methoxy-4-methylphenyl)-1-(2-ethoxyethyl)-2-phenyl-2H-cyclohex[d][1,3]oxazine*

In the manner given in Example 1, a mixture of α-(2-methoxy - 4-methylphenyl)-2-(2-ethoxyethylamino)cyclohexanemethanol and benzaldehyde in benzene solution was heated to reflux to give octahydro-4-(2-methoxy-4-methylphenyl) - 1 - (2 - ethoxyethyl)-2-phenyl-2H-cyclohex[d][1,3]oxazine.

EXAMPLE 21

*Decahydro-4-(p-ethoxyphenyl)-1,2-dimethyl-2H-cyclooct[d][1,3]oxazine*

In the manner given in Example 1, a mixture of α-(p-ethoxyphenyl)-2-(methylamino)cyclooctanemethanol and paraldehyde in benzene solution was heated to reflux to give decahydro - 4 - (p-ethoxyphenyl)-1,2-dimethyl-2H-cyclooct[d][1,3]oxazine.

EXAMPLE 22

*Decahydro-4-(p-bromophenyl)-1-isobutyl-2-phenyl-2H-cyclooct[d][1,3]oxazine*

In the manner given in Example 1, a mixture of α-(p-bromphenyl)-2-(isobutylamino)cyclooctanemethanol and benzaldehyde in benzene was heated to reflux to give a decahydro - 4 - (p-bromophenyl)-1-isobutyl-2-phenyl-2H-cyclooct[d][1,3]oxazine.

EXAMPLE 23

*Decahydro-4-(m-methylphenyl)-1-(o-tolyl)-2-ethyl-2H-cyclooct[d][1,3]oxazine*

In the manner given in Example 1, a mixture of α-(m-methylphenyl) - 2-(o-toluidino)cyclooctanemethanol and propionaldehyde in benzene solution was heated to reflux to give decahydro - 4 - (m-methylphenyl)-1-(o-tolyl)-2-ethyl-2H-cyclooct[d][1,3]oxazine.

EXAMPLE 24

*Decahydro-4-(2,5-diiodophenyl)-1-methyl-2-propylcyclohept[d][1,3]oxazine*

In the manner given in Example 1, a mixture of α-(2,5-diiodophenyl) - 2 - (methylamino)cycloheptanemethanol and butyraldehyde in benzene solution was heated to reflux to give decahydro-4-(2,5-diiodophenyl)-1-methyl-2-propylcyclohept[d][1,3]oxazine.

EXAMPLE 25

*Octahydro-4-(p-bromophenyl)-1-ethyl-2-phenylcyclopent[d][1,3]oxazine*

In the manner given in Example 1, a mixture of α-(p-bromophenyl)-2-(ethylamino)cyclopentanemethanol and benzaldehyde in benzene solution was heated to reflux to give octahydro-4-(p-bromophenyl)-1-ethyl-2-phenylcyclopent[d][1,3]oxazine.

EXAMPLE 26

*Octahydro-4-(p-hexylphenyl)-1-(2-ethoxybutyl)-2-pentylcyclopent[d][1,3]oxazine*

In the manner given in Example 1, a mixture of α-(p-hexylphenyl) - 2 - (2 - ethoxybutylamino)cyclopentanemethanol and caproaldehyde in benzene was heated to reflux to give octahydro-4-(p-hexylphenyl)-1-(2-ethoxybutyl)-2-pentylcyclopent[d][1,3]oxazine.

EXAMPLE 27

*Decahydro-4-(2,4-diiodophenyl)-1-ethyl-2-(p-ethylphenyl)cyclohepty[d][1,3]oxazine*

In the manner given in Example 1, a mixture of α-(2,4-diiodophenyl) - 2 - (ethylamino)cycloheptanemethanol and p-ethylbenzaldehyde in benzene solution was heated to reflux to give decahydro - 4-(2,4-diiodophenyl)-1-ethyl-2-(p-ethylphenyl)cyclohept[d][1,3]oxazine.

EXAMPLE 28

*Octahydro-1,4-bis(p-methoxyphenyl)-2-phenyl-2H-cyclohex[d][1,3]oxazine*

In the manner given in Example 1, a mixture of α-(p-methoxyphenyl) - 2-(p-methoxyanilino)cyclohexanemethanol and benzaldehyde in toluene solution was heated to reflux to give octahydro - 1,4 - bis(p-methoxyphenyl)-2-phenyl-2H-cyclohex[d][1,3]oxazine.

EXAMPLE 29

*Octahydro-4-(p-methoxyphenyl)-1-cyclohexyl-2H-cyclohex[d][1,3]oxazine*

In the manner given in Example 1, a mixture of α-(p-methoxyphenyl) - 2-(cyclohexylamino)cyclohexanemethanol and paraformaldehyde in benzene solution was heated to reflux to give octahydro - 4-(p-methoxyphenyl)-1-cyclohexyl-2H-cyclohex[d][1,3]oxazine.

EXAMPLE 30

*Octahydro-4-(p-methoxyphenyl)-1-phenyl-2H-cyclohex[d][1,3]oxazine*

In the manner given in Example 1, a mixture of α(p-methoxyphenyl)-2-anilinocyclohexanemethanol and paraformaldehyde in benzene solution was heated to reflux to give octahydro - 4-(p-methoxyphenyl)-1-phenyl-2H-cyclohex[d][1,3]oxazine.

EXAMPLE 31

Cis-A-octahydro-4-(p-methoxyphenyl)-2H-cyclohex[d][1,3]oxazine

In the manner given in Example 1, a mixture of cis-A-α-(p-methoxyphenyl) - 2-aminocyclohexanemethanol and paraformaldehyde in benzene solution was heated to reflux to give cis-A-octahydro - 4 - (p-methoxyphenyl)-2H-cyclohex[d][1,3]oxazine.

EXAMPLE 32

Cis-B-octahydro-4-(p-methoxyphenyl)-2H-cyclohex[d][1,3]oxazine

In the manner given in Example 1, a mixture of cis-B-α-(p-methoxyphenyl) - 2 - aminocyclohexanemethanol and paraformaldehyde in benzene solution was heated to reflux to give cis-B-octahydro-4-(p-methoxyphenyl)-2H-cyclohex[d][1,3]oxazine.

EXAMPLE 33

Cis-A-octahydro-4-(o-methoxyphenyl)-2H-cyclohex[d][1,3]oxazine

In the manner given in Example 1, a mixture of cis-A-α-(o-methoxyphenyl) - 2-aminocyclohexanemethanol and paraformaldehyde in benzene solution was heated to reflux to give cis-A-octahydro - 4-(o-methoxyphenyl)-2H-cyclohex[d][1,3]oxazine.

EXAMPLE 34

Cis-A-octahydro-4-(3,4,5-trimethoxyphenyl)-2-ethyl-2H-cyclohex[d][1,3]oxazine

In the manner given in Example 1, a mixture of cis-A-α-(3,4,5 - trimethoxyphenyl)-2-aminocyclohexanemethanol and propionaldehyde in benzene solution was heated to reflux to give cis-A-octahydro-4-(3,4,5-trimethoxyphenyl)-2-ethyl-2H-cyclohex[d][1,3]oxazine.

EXAMPLE 35

Octahydro-4-(p-ethoxyphenyl)-2-phenyl-2H-cyclohex[d][1,3]oxazine

In the manner given in Example 1, a mixture of α-(p-ethoxyphenyl) - 2-aminocyclohexanemethanol and benzaldehyde in benzene solution was heated to reflux to give octahydro - 4 - (p-ethoxyphenyl) - 2-phenyl-2H-cyclohex[d][1,3]oxazine.

EXAMPLE 36

Octahydro-4-(3,4,5-trimethoxyphenyl)-2-ethylcyclopent[d][1,3]oxazine

In the manner given in Example 1, a mixture of α-(3,4,5-trimethoxyphenyl) - 2 - aminocyclopentamethanol and propionaldehyde in benzene solution was heated to reflux to give octahydro-4-(3,4,5-trimethoxyphenyl)-2-ethylcyclopent[d][1,3]oxazine.

EXAMPLE 37

Decahydro-4-(3,4,5-trimethoxyphenyl)-2-ethylcyclohept[d][1,3]oxazine

In the manner given in Example 1, a mixture of α-(3,4,5 - trimethoxyphenyl) - 2 - aminocycloheptanemethanol and propionaldehyde in benzene solution was heated to reflux to give decahydro-4-(3,4,5-trimethoxyphenyl)-2-ethylcyclohept[d][1,3]oxazine.

EXAMPLE 38

Octahydro-4-(p-methoxyphenyl)-2-propyl-cyclopent[d][1,3]oxazine

In the manner given in Example 1, a mixture of α-(p-methoxyphenyl) - 2 - aminocyclopentamethanol and butyraldehyde in benzene solution was heated to reflux to give octahydro-4-(p-methoxyphenyl) - 2 - propylcyclopent[d][1,3]oxazine.

EXAMPLE 39

Octahydro-4-(p-chlorophenyl)-2-propyl-2H-cyclohex[d][1,3]oxazine

In the manner given in Example 1, a mixture of α-(p-chlorophenyl) - 2 - aminocyclohexanemethanol and butyraldehyde in benzene solution was heated to reflux to give octahydro - 4 - (p-chlorophenyl) - 2 - propyl-2H-cyclohex[d][1,3]oxazine.

EXAMPLE 40

Decahydro-4-(p-ethoxyphenyl)-2-(p-ethylphenyl)-2H-cyclooct[d][1,3]oxazine

In the manner given in Example 1, a mixture of α-(p-ethoxyphenyl)-2-aminocyclooctanemethanol and p-ethylbenzaldehyde in toluene solution was heated to reflux to give decahydro-4-(p-ethoxyphenyl) - 2 - (p-ethylphenyl)-2H-cyclooct[d][1,3]oxazine.

EXAMPLE 41

Decahydro-4-(2,3,4-trimethoxyphenyl)-2-methyl-2H-cyclooct[d][1,3]oxazine

In the manner given in Example 1, a mixture of α-(3,4,5-trimethoxyphenyl) - 2 - aminocyclooctanemethanol and paraldehyde in benzene solution was heated to reflux to give decahydro-4-(2,3,4-trimethoxyphenyl)-2-methyl-2H-cyclooct[d][1,3]oxazine.

EXAMPLE 42

Decahydro-4-(p-trifluoromethylphenyl)-2-phenyl-cyclohept[d][1,3]oxazine

In the manner given in Example 1, a mixture of α-(p-trifluoromethylphenyl) - 2 - aminocycloheptanemethanol and benzaldehyde in toluene solution was heated to reflux to give decahydro - 4 - (p-trifluoromethylphenyl)-2-phenylcyclohept[d][1,3]oxazine.

In the same manner given in Example 1, heating to reflux an α-phenyl-2-(amino or monosubstituted amino) cycloalkanemethanol (I) with an aldehyde (IV) in an organic solvent provides perhydrocycloalkoxazines of Formula II in which $$\begin{matrix} R_2 \\ \diagdown \\ \diagup \\ R_3 \end{matrix} \text{ corresponds to } \begin{matrix} H \\ \diagdown \\ \diagup \\ R_4 \end{matrix}$$

$R_4$ being defined as hereinbefore. Representative compounds, thus prepared, include:

octahydro-4-(p-fluorophenyl)-2-phenyl-2H-cyclohex[d][1,3]oxazine;
octahydro-4-(2-methoxy-4-methylphenyl)-2-(p-tolyl)-2H-cyclohex[d][1,3]oxazine;
octahydro-4-(3,5-dimethyl-4-methoxyphenyl)-2-ethyl-2H-cyclohex[d][1,3]oxazine;
octahydro-4-(p-trifluoromethylphenyl)-2-methyl-2H-cyclohex[d][1,3]oxazine;
octahydro-4-(p-isopropoxyphenyl)-1,2-diphenyl-2H-cyclohex[d][1,3]oxazine;
octahydro-4-(p-pentylphenyl)-1-hexyl-2-methyl-2H-cyclohex[d][1,3]oxazine;
octahydro-4-(2,3-diehylphenyl)-1-(2-methoxyethyl)-2-ethyl-2H-cyclohex[d][1,3]oxazine;
octahydro-4-(2,4-diethoxyphenyl)-2-phenyl-2H-cyclohex[d][1,3]oxazine;
octahydro-4-(p-fluorophenyl)-2-(m-tolyl)-2H-cyclohex[d][1,3]oxazine;
octahydro-4-(p-iodophenyl)-2H-cyclohex[d][1,3]oxazine;
octahydro-4-(p-bromophenyl)-2-ethyl-2H-cyclohex[d][1,3]oxazine;
octahydro-4-(2,4-dimethylphenyl)-2-propyl-2H-cyclohex[d][1,3]oxazine;
octahydro-4-(2,5-diiodophenyl)-2-phenyl-2H-cyclohex[d][1,3]oxazine;

octahydro-4-(p-isopropoxyphenyl)-2-(o-ethylphenyl)-2H-cyclohex[d][1,3]oxazine;
octahydro-4-(p-pentylphenyl)-2-(m-propylphenyl)-2H-cyclohex[d][1,3]oxazine;
octahydro-4-(o-bromophenyl)-2-(o-butylphenyl)-2H-cyclohex[d][1,3]oxazine;
octahydro-4-(p-hexylphenyl)-2-methylcyclopent[d][1,3]oxazine;
octahydro-4-(p-butoxyphenyl)-2-ethylcyclopent[d][1,3]oxazine;
octahydro-4-(p-isopropoxyphenyl)-2-propylcyclopent[d][1,3]oxazine;
octahydro-4-(m-trifluoromethylphenyl)-2-phenylcyclopent[d][1,3]oxazine;
octahydro-4-(2,4-diiodophenyl)-2-butylcyclopent[d][1,3]oxazine;
octahydro-4-(p-fluorophenyl)-2-pentylcyclopent[d][1,3]oxazine;
octahydro-4-(p-bromophenyl)-2-hexylcyclopent[d][1,3]oxazine;
octahydro-4-(p-isopropoxyphenyl)-1,2-diphenylcyclopent[d][1,3]oxazine;
octahydro-4-(p-butoxyphenyl)-1-methyl-2-ethylcyclopent[d][1,3]oxazine;
octahydro-4-(p-isopropoxyphenyl)-1,2-diethylcyclopent[d][1,3]oxazine;
octahydro-4-(m-trifluoromethylphenyl)-1-butyl-2-pentylcyclopent[d][1,3]oxazine;
octahydro-4-(2,4-diiodophenyl)-1-(3-ethoxypropyl)-2-methylcyclopent[d][1,3]oxazine;
octahydro-4-(p-fluorophenyl)-1-(m-tolyl)-2-phenylcyclopent[d][1,3]oxazine;
octahydro-4-(p-pentylphenyl)-1-hexylcyclopent[d][1,3]oxazine;
decahydro-4-(2,5-diiodophenyl)-2-methylcyclohept[d][1,3]oxazine;
decahydro-4-(3,4-dipropylphenyl)-2-ethylcyclohept[d][1,3]oxazine;
decahydro-4-(3,4,5-triethoxyphenyl)-2-propylcyclohept[d][1,3]oxazine;
decahydro-4-(o-chlorophenyl)-2-isobutylcyclohept[d][1,3]oxazine;
decahydro-4-(2,4-dichlorophenyl)-2-phenylcyclohept[d][1,3]oxazine;
decahydro-4-(p-trifluoromethylphenyl)-2-(2-methylbutyl)cyclohept[d][1,3]oxazine;
decahydro-4-(p-iodophenyl)cyclohept[d][1,3]oxazine;
decahydro-4-(3,4,5-triethoxyphenyl)-1-ethyl-2-propylcyclohept[d][1,3]oxazine;
decahydro-4-(o-chlorophenyl)-1-(o-tolyl)-2-phenylcyclohept[d][1,3]oxazine;
decahydro-4-(2,4-dichlorophenyl)-1-(4-ethoxybutyl)-2-butylcyclohept[d][1,3]oxazine;
decahydro-4-(p-trifluoromethylphenyl)-1-propylcyclohept[d][1,3]oxazine;
decahydro-4-(m-methylphenyl)-2-methyl-2H-cyclooct[d][1,3]oxazine;
decahydro-4-(p-ethoxyphenyl)-2-ethyl-2H-cyclooct[d][1,3]oxazine;
decahydro-4-(p-bromophenyl)-2-propyl-2H-cyclooct[d][1,3]oxazine;
decahydro-4-(2,4-diethoxyphenyl)-2-isobutyl-2H-cyclooct[d][1,3]oxazine;
decahydro-4-(o-fluorophenyl)-2-(2-methylbutyl)-2H-cyclooct[d][1,3]oxazine;
decahydro-4-(p-methoxyphenyl)-2-phenyl-2H-cyclooct[d][1,3]oxazine;
decahydro-4-(p-butoxyphenyl)-2-(p-tolyl)-2H-cyclooct[d][1,3]oxazine;
decahydro-4-(3,5-dipropylphenyl)-2-(o-prophenyl)-2H-cyclooct[d][1,3]oxazine;
decahydro-4-(3,4,5-triethoxyphenyl)-1-ethyl-2-methyl-2H-cyclooct[d][1,3]oxazine;
decahydro-4-(2,4-diethoxyphenyl)-1-isobutyl-2-phenyl-2H-cyclooct[d][1,3]oxazine;
decahydro-4-(o-fluorophenyl)-1-hexyl-2-pentyl-2H-cyclooct[d][1,3]oxazine;
decahydro-4-(p-methoxyphenyl)-2-isopropyl-2H-isopropyl-2H-cyclooct[d][1,3]oxazine;
decahydro-4-(p-butoxyphenyl)-1-phenyl-2-ethyl-2H-cyclooct[d][1,3]oxazine;
decahydro-4-(p-butoxyphenyl)-1,2-diphenyl-2H-cyclooct[d][1,3]oxazine;
decahydro-4-(p-butoxyphenyl)-1-phenyl-2H-cyclooct[d][1,3]oxizane; and the like.

EXAMPLE 43

*Cis-A-octahydro-4-(p-methoxyphenyl)-1-methyl-2H-cyclohex[d][1,3]oxazin-2-one*

A solution of 2.5 g. (0.01 mole of cis-A-α-(p-methoxyphenyl)-2-(methylamino)cyclohexanemethanol and 3.5 g. of N,N'-carbonyldiimidazole in 25 ml. of dry tetrahydrofuran (purified by passage over neutral alumina) was kept standing at room temperature (about 24° C.) for a period of 15 minutes; the mixture was thereupon concentrated in vacuo until a residue was obtained. The residue was diluted with 200 ml. of cold water and extracted with three portions of 25 ml. each of methylene chloride. The methylene chloride extracts were washed with 10% aqueous hydrochloric acid, water, saturated aqueous sodium chloride solution and dried with anhydrous magnesium sulfate. The solution was thereupon evaporated to give 2.70 g. (98% yield) of a white solid of melting point 120–122° C. which was recrystallized from benzene-Skellysolve B hexanes to give pure cis-A-octahydro-4-(p-methoxyphenyl) - 1 - methyl - 2H - cyclohex[d][1,3]oxazin-2-one of melting point 121–122° C.

*Analysis.*—Calcd. for $C_{16}H_{21}NO_3$: C, 69.79; H, 7.69; N, 5.09. Found: C, 70.04; H, 7.68; N, 5.27.

Other crystallization from benzene-Skellysolve B hexanes gave cis-A-octahydro-4-(p-methoxyphenyl)-1-methyl-2H-cyclohex[d][1,3] oxazin-2-one as a polymorph of melting point 139–141° C which had the same nuclear magnetic resonance spectrum as the earlier described polymorph of melting point 121–122° C.

EXAMPLE 44

*Cis-B-octahydro-4-(p-methoxyphenyl)-1-methyl-2H-cyclohex[d][1,3]oxazin-2-one*

In the same manner given in Example 43, 1.25 g. (0.0050 mole) of cis-B-α-(p-methoxyphenyl)-2-(methylamino)cyclohexane methanol and 1.8 g. of N,N'-carbonyldiimidazole in 25 ml. of dry tetrahydrofuran were allowed to stand at room temperature to give after workup 1.45 g. of white solid of melting point 186–187° C. Recrystallization from benzene-Skellysolve B hexanes gave pure cis-B-octahydro 4-(p-methoxyphenyl)-1-methyl-2H-cyclohex[d][1,3]oxazin-2-one of melting point 187–188° C. Ultraviolet: $\lambda_{max.}$ 226 (13,250); 274 (1,450); 281 (1,250).

*Analysis.*—Calcd. for $C_{16}H_{21}NO_3$: C, 69.79; H, 7.69; N, 5.09. Found: C, 69.78; H, 7.82; N, 5.03.

EXAMPLE 45

*Conversion of cis-A-octahydro-4-(p-methoxyphenyl)-1-methyl-2H-cyclohex[d][1,3]oxazin-2-one to the cis-B-epimer*

Method A.—To 1.03 g. of cis-A-octahydro-4-(p-methoxyphenyl)-1-methyl-2H - cyclohex[d][1,3]oxazin - 2-one was added 5 ml. of trifluoroacetic acid. The greenish solution was left to stand at room temperature for 15 minutes after which the reaction mixture was poured into 300 ml. of cold 5% aqueous sodium carbonate solution. This solution was extracted with chloroform, the chloroform extracts were combined, washed with water, saturated sodium chloride and dried over anhydrous magnesium sulfate. The resulting solution was then concentrated in vacuo to give 1.3 g. of solid material which after trituration with boiling ether left 0.945 g. (91.6%) of cis-B-octahydro-4-(p-methoxyphenyl) - 1 - methyl - 2H-cyclohex[d][1,3]oxazin-2-one of melting point 184–187° C. This material had identical nuclear magnetic resonance spectrum with that of Example 44.

Method B.—A solution of 0.50 g. of cis-A-octahydro-4-(p-methoxyphenyl) - 1 - methyl-2-H-cyclohex[d][1,3]oxazin-2-one was heated in 5 ml. of 98% formic acid on the steam bath for 15 minutes. The resulting solution was poured into 150 ml. of ice water and extracted with methylene chloride. The methylene chloride extracts were washed with water, 10% aqueous sodium carbonate solution and then dried over anhydrous magnesium sulfate. The dried solution was evaporated, the product triturated with Skellysolve B hexanes and recrystallized several times from benzene-Skellysolve B hexanes to give 0.22 g. (44%) of the cis-B-isomer having a melting point of 185–187° C. and having the identical infrared spectrum of the product of Example 44.

EXAMPLE 46

Cis-A-octahydro-4-(p-methoxyphenyl)-2H-cyclohex[d][1,3]oxazin-2-one

In the manner given in Example 43, 2.35 g. of cis-A-α-(p-methoxyphenyl) - 2-aminocyclohexanemethanol was heated with 3.5 g. of N,N'-carbonyldiimidazole in tetrahydrofuran. After work-up, 2.6 g. of a white solid was obtained of melting point 235–240° C. This solid was recrystallized from absolute ethanol to give as colorless plates 1.65 g. (63%) of cis-A-octahydro-4-(p-methoxyphenyl)-cyclohex[d][1,3]oxazin-2-one of melting point 246–247° C.

Analysis.—Calcd. for $C_{15}H_{19}NO_3$: C, 68.94; H, 7.33; N, 5.36. Found: C, 68.71; H, 7.16; N, 5.38. Ultraviolet: $\lambda_{max}$. 226 (12,450); 268 sh. (1,200); 274 (1,600); 282 (1,400).

EXAMPLE 47

Cis-B-octahydro-4-(p-methoxyphenyl)-2H-cyclohex[d][1,3]oxazin-2-one

In the manner given in Example 43, 2.35 g. of cis-B-α-(p-methoxyphenyl)-2-aminocyclohexanemethanol was reacted with 3.5 g. of N,N'-carbonyldiimidazole in tetrahydrofuran. After work-up of the mixture, 2.14 g. (82%) of a product melting at 152–155° C. was obtained. This product was repeatedly recrystallized from benzene-Skellysolve B hexanes to give cis-B-octahydro-4-(p-methoxyphenyl)-2H-cyclohex[d][1,3]oxazin-2-one of melting point 156–157° C. Ultraviolet: $\lambda_{max}$. 226 (12,650); 268 sh. 274 (1,550); 281 (1,300).

Analysis.—Calcd. for $C_{15}H_{19}NO_3$: C, 68.94; H, 7.33; N, 5.36. Found: C, 69.18; H, 7.14; N, 5.61.

EXAMPLE 48

Cis-octahydro-4-(3,4,5-trimethoxyphenyl)-1-benzyl-2H-cyclohex[d][1,3]oxazin-2-one In the manner given in Example 43, cis-α-(3,4,5-trimethoxyphenyl)-2 - (benzylamino)cyclohexanemethanol was treated with N,N'-carbonyldiimidazole in tetrahydrofuran to give cis-octahydro-4-(3,4,5-trimethoxyphenyl)-1-benzyl-2H-cyclohex[d][1,3]oxazin-2-one.

EXAMPLE 49

Octahydro-4-(p-ethoxyphenyl)-1-ethyl-2H-cyclohex[d][1,3]oxazin-2-one

In the manner given in Example 43, α-(p-ethoxyphenyl)-2-(ethylamino)cyclohexanemethanol was treated with N,N'-carbonyldiimidazole in tetrahydrofuran to give octahydro-4-(p - ethoxyphenyl)-1-ethyl-2H-cyclohex[d][1,3]oxazin-2-one.

EXAMPLE 50

Octahydro-4-(o-methoxyphenyl)-1-(3-methoxypropyl)-2H-cyclohex[d][1,3]oxazin-2-one In the manner given in Example 43, α-(o-methoxyphenyl)-2-(3-methoxypropylamino)cyclohexanemethanol was reacted with N,N'-carbonyldiimidazole in tetrahydrofuran to give octahydro - 4 - (o-methoxyphenyl)-1-(3-methoxypropyl)-2H-cyclohex[d][1,3]oxazin-2-one.

EXAMPLE 51

Octahydro-4-(2-methoxy-4-methylphenyl)-1-phenyl-2H-cyclohex[d][1,3]oxazin-2-one

In the manner given in Example 43, α-(2-methoxy-4-methylphenyl)-2-anilinocyclohexanemethanol was treated with N,N'-carbonyldiimidazole in tetrahydrofuran to give octahydro-4-(2-methoxy - 4 - methylphenyl)-1-phenyl-2H-cyclohex[d][1,3]oxazin-2-one.

EXAMPLE 52

Octahydro-4-(3,5-dimethyl-4-methoxyphenyl)-1-propyl-2H-cyclohex[d][1,3]oxazin-2-one In the manner given in Example 43, α-(3,5-dimethyl-4-methoxyphenyl)-2 - (propylamino)cyclohexanemethanol was reacted with N,N'-carbonyldiimidazole in tetrahydrofuran to give octahydro-4-(3,5-dimethyl-4-methoxyphenyl)-1-propyl-2H-cyclohex[d][1,3]oxazin-2-one.

EXAMPLE 53

Octahydro-4-(p-trifluoromethylphenyl)-1-pentyl-2H-cyclohex[d][1,3]oxazin-2-one

In the manner given in Example 43, α-(p-trifluoromethylphenyl)-2-(pentylamino)cyclohexanemethanol was treated with N,N'-carbonyldiimidazole in tetrahydrofuran to give octahydro-4-(p-trifluoromethylphenyl)-1-pentyl-2H-cyclohex[d][1,3]oxazin-2-one.

EXAMPLE 54

Octahydro-4-(p-chlorophenyl)-1-isopropyl-2H-cyclohex[d][1,3]oxazin-2one

In the manner given in Example 43, α-(p-chlorophenyl)-2-(isopropylamino)cyclohexanemethanol was reacted with N,N'-carbonyldiimidazole in tetrahydrofuran to give octahydro-4 - (p-chlorophenyl) - 1-isopropyl-2H-cyclohex[d][1,3]oxazin-2-one.

EXAMPLE 55

Octahydro-4-(o-methylphenyl)-2H-cyclohex[d][1,3]oxazin-2-one

In the manner given in Example 43, α-(o-methylphenyl)-2-aminocyclohexanemethanol was treated with N,N'-carbonyldiimidazole in tetrahydrofuran to give octahydro-4-(o-methylphenyl)-2H-cyclohex[d][1,3]oxazin-2-one.

EXAMPLE 56

Octahydro-4-(p-methoxyphenyl)-1-ethyl-2H-cyclohex[d][1,3]oxazin-2-one

In the manner given in Example 43, α-(p-methoxyphenyl)-2-(ethylamino)cyclohexanemethanol was reacted with N,N'-carbonyldiimidazole in tetrahydrofuran to give octahydro-4-(p-methoxyphenyl)-1-ethyl-2H-cyclohex[d][1,3]oxazin-2-one.

EXAMPLE 57

Octahydro-4-(2,4-dimethylphenyl)-1-(p-tolyl)-2H-cyclohex[d][1,3]oxazin-2-one

In the manner given in Example 43, α-(2,4-dimethylphenyl)-2-(p-toluidino)cyclohexanemethanol was reacted with N,N'-carbonyldiimidazole in tetrahydrofuran to give octahydro-4-(2,4-dimethylphenyl)-1-(p-tolyl)-2H - cyclohex[d][1,3]oxazin-2-one.

EXAMPLE 58

Octahydro-4-(2-methoxy-4-methylphenyl)-1-(2-ethoxyethyl)-2H-cyclohex[d][1,3]oxazin-2-one In the manner given in Example 43, α-(2-methoxy-4-methylphenyl) - 2 - (2 - ethoxyethylamino)cyclohexanemethanol was reacted with N,N'-carbonyldiimidazole in tetrahydrofuran to give octahydro-4-(2-methoxy-4-methylphenyl)-1-(2-ethoxyethyl)-2H-cyclohex[d][1,3]oxazin-2-one.

EXAMPLE 59

*Octahydro-4-(p-fluorophenyl)-2H-cyclohex-[d][1,3]oxazin-2one*

In the manner given in Example 43, α-(p-fluorophenyl)-2-aminocyclohexanemethanol was treated with N,N'-carbonyldiimidazole in tetrahydrofuran to give octahydro-4-(p-fluorophenyl)-2H-cyclohex[d][1,3]oxazin-2-one.

EXAMPLE 60

*Cis-A-octahydro-4-(m-methoxyphenyl)-2-cyclohex[d][1,3]oxazin-2-one*

In the manner given in Example 43, cis-A-α-(m-methoxyphenyl)-2-aminocyclohexanemethanol was reacted with N,N'-carbonyldiimidazole in tetrahydrofuran to give cis-A-octahydro-4-(m-methoxyphenyl)-2H - cyclohex[d]-[1,3]oxazin-2-one.

EXAMPLE 61

*Cis-B-octahydro-4-(m-methoxyphenyl)-2H-cyclohex[d][1,3]oxazin-2-one*

In the manner given in Example 43, cis-B-α-(m-methoxyphenyl)-2-aminocyclohexanemethanol was reacted with N,N'-carbonyldiimidazole in tetrahydrofuran to give cis-B-octahydro-4-(m-methoxyphenyl)-2H - cyclohex[d]-[1,3]oxazin-2-one.

EXAMPLE 62

*Cis-A-octahydro-4-(o-methoxyphenyl)-2H-cyclohex[d][1,3]oxazin-2-one*

In the manner given in Example 43, cis-A-α-(o-methoxyphenyl)-2-aminocyclohexanemethanol was treated with N,N'-carbonyldiimidazole in tetrahydrofuran to give cis-A-octahydro-4-(o-methoxyphenyl)-2H - cyclohex[d]-[1,3]oxazin-2-one.

EXAMPLE 63

*Octahydro-4-(2-methoxy-4-methylphenyl)-2H-cyclohex[d][1,3]oxazin-2-one*

In the manner given in Example 43, α-(2-methoxy-4-methylphenyl)-2-aminocyclohexanemethanol was reacted with N,N'-carbonyldiimidazole in tetrahydrofuran to give octahydro - 4-(2-methoxy-4-methylphenyl)-2H-cyclohex-[d][1,3]oxazin-2-one.

EXAMPLE 64

*Octahydro-4-(3,5-dimethyl-4-methoxyphenyl)-2H-cyclohex[d][1,3]oxazin-2-one*

In the manner given in Example 43, α-(3,5-dimethyl-4-methoxyphenyl) - 2 - aminocyclohexanemethanol was reacted with N,N'-carbonyldiimidazole in tetrahydrofuran to give octahydro-4-(3,5-dimethyl-4-methoxyphenyl)-2H-cyclohex[d][1,3]oxazin-2-one.

EXAMPLE 65

*Octahydro-4-(p-trifluoromethylphenyl)-2H-cyclohex[d][1,3]oxazin-2-one*

In the manner given in Example 43, α-(p-trifluoromethylphenyl)-2-aminocyclohexanemethanol was reacted with N,N'-carbonyldiimidazole in tetrahydrofuran to give octahydro-4-(p-trifluoromethylphenyl)-2H - cyclohex[d][1,3] oxazin-2-one.

EXAMPLE 66

*Octahydro-4-(p-chlorophenyl)-2H-cyclohex[d][1,3]oxazin-2-one*

In the manner given in Example 43, α-(p-chlorophenyl)-2-aminocyclohexanemethanol was reacted with N,N'-carbonyldiimidazole in tetrahydrofuran to give octahydro-4-(p-chlorophenyl) - 2H - cyclohex[d][1,3]oxazin-2-one.

EXAMPLE 67

*Hexahydro-4-(3,4,5-trimethoxyphenyl)-1-butylcyclopent[d][1,3]oxazin-2(1H)one*

In the manner given in Example 43, α-(3,4,5-trimethoxyphenyl) - 2 - butylamino)cyclopentanemethanol was treated with N,N'-carbonyldiimidazole in tetrahydrofuran to give hexahydro-4-(3,4,5-trimethoxyphenyl)-1-butylcyclopent[d][1,3]oxazin-2(1H)one.

EXAMPLE 68

*Hexahydro-4-(p-bromophenyl)-1-ethylcyclopent[d][1,3]oxazin-2(1H)one*

In the manner given in Example 43, α-(p-bromophenyl)-2-(ethylamino)cyclopentanemethanol was treated with N,N'-carbonyldiimidazole in tetrahydrofuran to give hexahydro - 4 - (p-bromophenyl) - 1 - ethylcyclopent[d][1,3]-oxazin-2(1H)one.

EXAMPLE 69

*Hexahydro-4-(p-hexylphenyl)-1-(4-ethoxybutyl)cyclopent[d][1,3]oxazin-2(1H)one*

In the manner given in Example 43, α-(p-hexylphenyl) - 2 - (4-ethoxybutylamino)cyclopentanemethanol was treated with N,N'-carbonyldiimidazole in tetrahydrofuran to give hexahydro-4-(p-hexylphenyl)-1-(4-ethoxybutyl)-cyclopent[d][1,3]oxazin-2-(1H)-one.

EXAMPLE 70

*Hexahydro-4-(3,4,5-trimethoxyphenyl)cyclopent[d][1,3]oxazin-2(1H)-one*

In the manner given in Example 43, α-(3,4,5-trimethoxyphenyl)-2-aminocyclopentanemethanol was treated with N,N'-carbonyldiimidazole in tetrahydrofuran to give hexahydro - 4 - (3,4,5 - trimethoxyphenyl)cyclopent[d]-[1,3]oxazin-2(1H)-one.

EXAMPLE 71

*Hexahydro-4-(p-methoxyphenyl)cyclopent[d][1,3]oxazin-2(1H)-one*

In the manner given in Example 43, α-(p-methoxyphenyl)-2-aminocyclopentanemethanol was treated with N,N'-carbonyldiimidazole in tetrahydrofuran to give hexahydro - 4 - (p - methoxyphenyl)cyclopent[d][1,3]oxazin-2-(1H)one.

EXAMPLE 72

*Octahydro-4-(3,4,5-trimethoxyphenyl)-1-hexylcyclohept[d][1,3]oxazin-2(1H)-one*

In the manner given in Example 43, α-(3,4,5-trimethoxyphenyl)-2-(hexylamino)cycloheptanemethanol was treated with N,N'-carbonyldiimidazole in tetrahydrofuran to give octahydro-4-(3,4,5-trimethoxyphenyl)-1-hexylcyclohept[d][1,3]oxazin-2(1H)-one.

EXAMPLE 73

*Octahydro-4-(2,5-diiodophenyl)-1-methylcyclohept[d][1,3]oxazin-2(1H)-one*

In the manner given in Example 43, α-(2,5-diiodophenyl) - 2 - (methylamino)cycloheptanemethanol was treated with N,N'-carbonyldiimidazole in tetrahydrofuran to give octahydro-4-(2,5-diiodophenyl) - 1 - methylcyclohept[d]-[1,3]oxazin-2(1H)-one.

EXAMPLE 74

*Octahydro-4-(2,4-diiodophenyl)-1-ethylcyclohept-[d][1,3]oxazin-2(1H)-one*

In the manner given in Example 43, α-(2,4-diiodophenyl)-2-(ethylamino)cycloheptanemethanol was treated with N,N'-carbonyldiimidazole in tetrahydrofuran to give octahydro - 4 - (2,4 - diiodophenyl)-1-ethylcyclohept[d][1,3]oxazin-2(1H)-one.

EXAMPLE 75

*Octahydro-4-(3,4,5-trimethoxyphenyl)cyclohept[d] [1,3]oxazin-2(1H)-one*

In the manner given in Example 43, α-(3,4,5-trimethoxyphenyl) - 2-aminocycloheptanemethanol was treated with N,N'-carbonyldiimidazole in tetrahydrofuran to give octahydro - 4 - (3,4,5 - trimethoxyphenyl)cyclohept[d] [1,3]oxazin-2(1H)-one.

EXAMPLE 76

*Decahydro-4-(p-ethoxyphenyl)-1-methyl-2H-cyclooct- [d][1,3]oxazin-2-one*

In the manner given in Example 43, α-(p-ethoxyphenyl) - 2 - (methylamino)cyclooctanemethanol was treated with N,N'-carbonyldiimidazole in tetrahydrofuran to give decahydro - 4 - (p-ethoxyphenyl)-1-methyl-2H-cyclooct[d][1,3]oxazin-2-one.

EXAMPLE 77

*Decahydro-4-(p-bromophenyl)-1-isobutyl-2H-cyclooct- [d][1,3]oxazin-2-one*

In the manner given in Example 43, α-(p-bromophenyl) - 2-(isobutylamino)cyclooctanemethanol was treated with N,N'-carbonyldiimidazole in tetrahydrofuran to give decahydro - 4 - (p - bromophenyl)-1-isobutyl-2H-cyclooct [d][1,3]oxazin-2-one.

EXAMPLE 78

*Decahydro-4-(p-ethoxyphenyl)-2H-cyclooct[d][1,3]- oxazin-2-one*

In the manner given in Example 43, α(p-ethoxyphenyl)-2-aminocyclooctanemethanol was treated with N,N'-carbonyldiimidazole in tetrahydrofuran to give decahydro-4-(p - ethoxyphenyl) - 2H-cyclooct[d][1,3]oxazin-2-one.

EXAMPLE 79

*Decahydro-4-(2,3,4-trimethoxyphenyl)-2H-cyclooct- [d][1,3]oxazin-2-one*

In the manner given in Example 43, α-(2,3,4-trimethoxyphenyl)-2-aminocyclootanemethanol was treated with N,N'-carbonyldiimidazole in tetrahydrofuran to give decahydro - 4 - (2,3,4 - trimethoxyphenyl)-2H-cyclooct [d][1,3]oxazin-2-one.

EXAMPLE 80

*Decahydro-4-(o-fluorophenyl)-2H-cyclooct[d][1,3]- oxazin-2-one*

In the manner given in Example 43, α-(o-fluorophenyl)-2-aminocyclooctanemethanol was treated with N,N'-carbonyldiimidazole in tetrahydrofuran to give decahydro-4-(o-fluorophenyl-2H-cyclooct[d][1,3]oxazin-2-one.

EXAMPLE 81

*Decahydro-4-(m-methylphenyl)-(o-tolyl)-2H- cyclooct[d][1,3]oxazin-2-one*

In the manner given in Example 43, α-(m-methylphenyl)-2-(o-toluidino)cyclooctanemethanol was treated with N,N'-carbonyldiimidazole in tetrahydrofuran to give decahydro - 4 - (m - methylphenyl) - 1-(o-tolyl)-2H-cyclooct[d][1,3]oxazin-2-one.

In the manner given in Example 43, reacting an amino alcohol of Formula I with N,N'-carbonyldiimidazole, produces perhydrocycloalkoxazin-2-ones of Formula II, wherein

is oxygen. Representative compounds thus produced include:

octahydro-1,4-bis(p-methoxyphenyl)-2H-cyclohex[d] [1,3]oxazin-2-one;
octahydro-4-(p-methoxyphenyl)-1-cyclohexyl-2H-cyclohex[d][1,3]oxazin-2-one;
octahydro-4-(p-methoxyphenyl)-1-phenyl-2H-cyclohex[d][1,3]oxazin-2-one;
octahydro-4-(3,4,5-trimethoxyphenyl)-2H-cyclohex [d][1,3]oxazin-2-one;
octahydro-4-(p-ethoxyphenyl)-2H-cyclohex[d][1,3] oxazin-2-one;
octahydro-4-(p-fluorophenyl)-1-phenyl-2H-cyclohex [d][1,3]oxazin-2-one;
octahydro-4-(p-butoxyphenyl)-1-methyl-2H-cyclohex [d][1,3]oxazin-2-one;
octahydro-4-(p-isopropylphenyl)-1-phenyl-2H-cyclohex[d][1,3]-oxazin-2-one;
octahydro-4-(p-pentylphenyl)-1-hexyl-2H-cyclohex[d][1,3]oxazin-2-one;
octahydro-4-(2,3-diethylphenyl)-1-(2-methoxyethyl)-2H-cyclohex[d][1,3]oxazin-2-one;
octahydro-4-(2,4-diethoxyphenyl)-2H-cyclohex [d][1,3]oxazin-2-one;
octahydro-4-(2,4-dimethylphenyl)-2H-cyclohex[d] [1,3]oxazin-2-one;
octahydro-4-(p-iodophenyl)-2H-cyclohex[d][1,3] oxazin-2-one;
octahydro-4-(p-fluorophenyl)-2H-cyclohex[d][1,3] oxazin-2-one;
octahydro-4-(2,5-diiodophenyl)-2H-cyclohex[d][1,3] oxazin-2-one;
octahydro-4-(p-isopropylphenyl)-2H-cyclohex[d][1,3] oxazin-2-one;
octahydro-4-(p-pentylphenyl)-2H-cyclohex[d][1,3] oxazin-2-one;
octahydro-4-(2,4-dibutoxyphenyl)-2H-cyclohex[d][1,3] oxazin-2-one;
octahydro-4-(o-bromophenyl)-2H-cyclohex[d][1,3] oxazin-2-one;
hexahydro-4-(p-butoxyphenyl)-1-methylcyclopent [d][1,3]oxazin-2(1H)-one;
hexahydro-4-(p-isopropylphenyl)-1-ethylcyclopent- [d][1,3]oxazin-2(1H)-one;
hexahydro-4-(m-trifluoromethylphenyl)-1-butylcyclopent [d][1,3]oxazin-2(1H)-one;
hexahydro-4-(2,4-diiodophenyl)-1-(3-ethoxypropyl) cyclopent[d][1,3]oxazin-2(1H)-one;
hexahydro-4-(p-fluorophenyl)-1-(p-tolyl)cyclopent [d][1,3]-oxazin-2(1H)-one;
hexahydro-4-(p-hexylphenyl)cyclopent[d][1,3]-oxazin-2(1H)-one;
hexahydro-4-(p-butoxyphenyl)cyclopent[d][1,3]-oxazin-2(1H)-one;
hexahydro-4-(p-isopropylphenyl)cyclopent[d][1,3] oxazin-2(1H)-one;
hexahydro-4-(p-trifluoromethylphenyl)-cyclopent [d][1,3]oxazin-2(1H)-one;
hexahydro-4-(2,4-diiodophenyl)-cyclopent[d][1,3] oxazin-2(1H)-one;
hexahydro-4-(p-fluorophenyl)-cyclopent[d][1,3]oxazin-2(1H)-one;
hexahydro-4-(p-bromophenyl)-cyclopent[d][1,3]oxazin-2(1H)-one;
octahydro-4-(3,4,5-triethoxyphenyl)-1-ethylcyclohept [d][1,3]oxazin-2(1H)-one;
octahydro-4-(o-chlorophenyl)-1-(o-tolyl)cyclohept [d][1,3]oxazin-2(1H)-one;
octahydro-4-(2,4-dichlorophenyl)-1-(4-ethoxybutyl) cyclohept[d][1,3]oxazin-2(1H)-one;
octahydro-4-(p-trifluoromethylphenyl)-1-propylcyclohept [d][1,3]oxazin-2(1H)-one;
octahydro-4-(2,5-diiodophenyl)cyclohept[d][1,3] oxazin-2(1H)-one;
octahydro-4-(3,4-dipropylphenyl)cyclohept[d][1,3] ozaxin-2(1H)-one;
octahydro-4-(3,4,5-triethoxyphenyl)cyclohept[d][1,3] oxazin-2(1H)-one;

octahydro-4-(o-chlorophenyl)cyclohept[d][1,3]oxazin-2(1H)-one;
octahydro-4-(2,4-dichlorophenyl)cyclohept[d][1,3]oxazin-2(1H)-one;
octahydro-4-(p-trifluoromethylphenyl)cyclohept[d][1,3]-oxazin-2(1H)-one;
octahydro-4-(p-iodophenyl)cyclohept[d][1,3]oxazin-2(1H)-one;
decahydro-4-(2,4-diethoxyphenyl)-1-isobutyl-2H-cyclooct[d][1,3]oxazin-2-one;
decahydro-4-(o-fluorophenyl)-1-hexyl-2H-cyclooct[d][1,3]oxazin-2-one;
decahydro-4-(p-methoxyphenyl)-2H-cyclooct[d][1,3]oxazin-2-one;
decahydro-4-(p-butoxyphenyl)-1-phenyl-2H-cyclooct[d][1,3]oxazin-2-one;
decahydro-4-(m-methylphenyl)-2H-cyclooct[d][1,3]oxazin-2-one;
decahydro-4-(p-ethoxyphenyl)-2H-cyclooct[d][1,3]oxazin-2-one;
decahydro-4-(p-bromophenyl)-2H-cyclooct[d][1,3]oxazin-2-one;
decahydro-4-(2,4-diethoxyphenyl)-2H-cyclooct[d][1,3]oxazin-2-one;
decahydro-4-(o-fluorophenyl)-2H-cyclooct[d][1,3]oxazin-2-one;
decahydro-4-(m-ethoxyphenyl)-2H-cyclooct[d][1,3]oxazin-2-one;
decahydro-4-(p-butoxyphenyl)-2H-cyclooct[d][1,3]oxazin-2-one;
decahydro-4-(3,4-dipropylphenyl)-2H-cyclooct[d][1,3]oxazin-2-one; and the like.

EXAMPLE 82

*Cis-A-octahydro-4-(p-methoxyphenyl)-1-methyl-2H-cyclohex[d][1,3]oxazin-2-one*

A mixture of 1 g. of cis-A-α-(p-methoxyphenyl)-2-(methylamino)cyclohexanemethanol, 2 g. of potassium carbonate, and 15 ml. of tetrahydrofuran was cooled to about 0–5° C. in an ice bath. Phosgene gas was thereupon passed through the cooled mixture until approximately 0.4 g. was absorbed. The mixture was allowed to warm to room temperature under continuous stirring, poured into 15 ml. of ice water, and extracted with three 20 ml. portions of methylene chloride. The methylene chloride extracts were combined, washed with water and aqueous saturated sodium chloride solution, then dried over anhydrous magnesium sulfate and evaporated to give a solid which was recrystallized from benzene-Skellysolve B hexanes, providing pure cis-A-octahydro-4-(p-methoxyphenyl)-1-methyl-2H-cyclohex[d][1,3]oxazin-2-one.

In the manner given in Example 82, alcohols of Formula I can be treated with phosgene at low temperature in equimolecular quantities to give the oxazinones corresponding to Formula II and as further illustrated by the products described in Examples 43 through 81.

EXAMPLE 83

*Cis-A-octahydro-4-(p-methoxyphenyl)-1-methyl-2H-cyclohex[d][1,3]oxazin-2-one*

A mixture of 0.52 g. (0.002 mole) of cis-A-octahydro-4-(p-methoxyphenyl)-2H-cyclohex[d][1,3]oxazin-2-one and 0.12 g. of 53.3% sodium hydride mineral oil dispersion in 35 ml. of dry dimethylformamide was stirred at room temperature (24–26° C.) for a period of 35 minutes. A solution of 0.45 g. (0.0032 mole) of methyl iodide in 5 ml. of dimethylformamide was added over a period of 2 minutes. The mixture was then stirred for 2.5 hours and the thus-obtained yellow solution was poured into 350 ml. of water. The aqueous mixture was thereupon extracted several times with ether, the combined ether extract was washed with aqueous saturated sodium chloride solution, dried over anhydrous magnesium sulfate and evaporated to a gum which was triturated with pentane to give 0.515 g. (93.5%) of a yellow solid melting at 140–141° C. This solid was recrystallized from benzene-Skellysolve B hexanes to give pure cis-A-octahydro-4-(p-methoxyphenyl) - 1 - methyl-2H-cyclohex[d][1,3]oxazin-2-one of melting point 140° C. and identical with the polymorph described in Example 43, having a melting point of 139–141° C.

EXAMPLE 84

*Cis-B-octahydro-4-(p-methoxyphenyl)-methyl-2H-cyclohex[d][1,3]oxazin-2-one*

In the manner given in Example 83, cis-B-octahydro-4-(p - methoxyphenyl) - 2H-cyclohex[d][1,3]oxazin-2-one was treated with sodium hydride mineral oil dispersion and then with methyl iodide to give cis-B-octahydro-4-(p-methoxyphenyl) - 1 - methyl-2H-cyclohex[d][1,3]oxazin-2-one of melting point 186–187.5° C.

EXAMPLE 85

*Octahydro-4-(3,4,5-trimethoxyphenyl)-1-hexyl-2H-cyclohex[d][1,3]oxazin-2-one*

In the manner given in Example 83, octahydro-4-(3,4,5-trimethoxyphenyl)-2H-cyclohex[d][1,3]oxazin-2-one was reacted with hexyl iodide in the presence of sodium hydride to give octahydro-4-(3,4,5-trimethoxyphenyl)-1-hexyl-2H-cyclohex[d][1,3]oxazin-2-one.

EXAMPLE 86

*Octahydro-4-(2,4-dimethylphenyl)-1-(2-hydroxyethyl)-2H-cyclohex[d][1,3]oxazin-2-one*

In the manner given in Example 83, octahydro-4-(2,4-dimethylphenyl) - 2H-cyclohex[d][1,3]oxazin-2-one was reacted with 1-chloro-2-hydroxyethane in the presence of sodium hydride to give octahydro-4-(2,4-dimethylphenyl)-1-(2-hydroxyethyl)-2H-cyclohex[d][1,3]-oxazin-2-one.

EXAMPLE 87

*Octahydro-4-(p-fluorophenyl)-1-(4-hydroxybutyl)-2H-cyclohex[d][1,3]oxazin-2-one*

In the manner given in Example 83, octahydro-4-(p-fluorophenyl)-2H-cyclohex[d][1,3]oxazin-2-one was reacted with 1-hydroxy-4-iodobutane in the presence of sodium hydride to give octahydro-4-(p-fluorophenyl)-1-(4-hydroxybutyl)-2H-cyclohex[d][1,3]oxazin-2-one.

EXAMPLE 88

*Hexahydro-4-(p-bromophenyl)-1-ethylcyclopent[d][1,3]-oxazin-2(1H)-one*

In the manner given in Example 83, hexahydro-4-(p-bromophenyl)cyclopent[d][1,3]oxazin - 2(1H)-one was reacted with ethyl iodide in the presence of sodium hydride to give hexahydro-4-(p-bromophenyl)-1-ethylcyclopent[d][1,3]oxazin-2(1H)-one.

EXAMPLE 89

*Hexahydro-4-(p-hexylphenyl)-1-(4-ethoxybutyl)cyclopent[d][1,3]oxazin-2(1H)-one*

In the manner given in Example 83, hexahydro-4-(p-hexylphenyl)cyclopent[d][1,3]oxazin-2(1H)-one was reacted with 1-ethoxy-4-iodobutane in the presence of sodium hydride to give hexahydro-4-(p-hexylphenyl)-1-(4-ethoxybutyl)cyclopent[d][1,3]-oxazine-2(1H)-one.

EXAMPLE 90

*Octahydro-4-(3,4,5-trimethoxyphenyl)-1-propylcyclohept[d][1,3]oxazin-2(1H)-one*

In the manner given in Example 83, octahydro-4-(3,4,5-trimethoxyphenyl)cyclohept[d][1,3]oxazin - 2(1H)-one was reacted with propyl iodide in the presence of sodium hydride to give octahydro-4-(3,4,5-trimethoxyphenyl)-1-propylcyclohept[d][1,3]oxazin-2(1H)-one.

EXAMPLE 91

*Octahydro-4-(2,5-diiodophenyl)-1-(2-hydoxyethyl)-cyclohept[d][1,3]oxazin-2(1H)-one*

In the manner given in Example 83, octahydro-4-(2,5-diiodophenyl)cyclohept[d][1,3]oxazin - 2(1H) - one was reacted with 1-bromo-2-hydroxyethane in the presence of sodium hydride to give octahydro-4-(2,5-diiodophenyl)-1-(2-hydroxyethyl)cyclohept[d][1,3]-oxazin-2(1H)-one.

EXAMPLE 92

*Decahydro-4-(2,3,4-trimethoxyphenyl)-1-(3-methoxypropyl)-2H-cyclooct[d][1,3]oxazin-2-one*

In the manner given in Example 83, decahydro-4-(2,3,4-trimethoxyphenyl)-2H-cyclooct[d][1,3]oxazin-2-one was reacted with 1-iodo-3-methoxypropane in the presence of sodium hydride to give decahydro-4-(2,3,4-trimethoxyphenyl) - 1 - (3 - methoxypropyl)-2H-cyclooct[d][1,3]oxazin-2-one.

EXAMPLE 93

*Decahydro-4-(p-ethoxyphenyl)-1-isopropyl-2H-cyclooct[d][1,3]oxazin-2-one*

In the manner given in Example 83, decahydro-4-(p-ethoxyphenyl)-2H-cyclooct[d][1,3]oxazin-2-one was reacted with isopropyl bromide in the presence of sodium hydride to give decahydro-4-(p-ethoxyphenyl)-1-isopropyl-2H-cyclooct[d][1,3]oxazin-2-one.

EXAMPLE 94

*Decahydro-4-(o-fluorophenyl)-1-(4-hydroxybutyl)-2H-cyclooct[d][1,3]oxazin-2-one*

In the manner given in Example 83, decahydro-4-(o-fluorophenyl)-2H-cyclooct[d][1,3]oxazin-2-one was reacted with 1-hydroxy-4-iodobutane in the presence of sodium hydride to give decahydro-4-(o-fluorophenyl)-1-(4-hydroxybutyl)-2H-cyclooct[d][1,3]oxazin-2-one.

EXAMPLE 95

*Cis-A-octahydro-4-(p-methoxyphenyl)-1-butyl-2H-cyclohex[d][1,3]oxazine*

A mixture of 1 g. of cis-A-octahydro-4-(p-methoxyphenyl)-2H-cyclohex[d][1,3]oxazine, 2.5 g. of butyl iodide, 1.5 g. of potassium carbonate in methylene chloride (50 ml.) was heated to reflux for 2 hours. The mixture was cooled, filtered, poured into 100 ml. of ice water, and the aqueous mixture extracted with methylene chloride. The methylene chloride extracts were washed with water, aqueous saturated sodium chloride solution, then dried over anhydrous magnesium sulfate, and evaporated. The thus-obtained residue was recrystallized from Skellysolve B hexanes-benzene to give cis-A-octahydro-4-(p-methoxyphenyl)-1-butyl-2H-cyclohex[d][1,3]oxazine.

EXAMPLE 96

*Cis-A-octahydro-4-(p-methoxyphenyl)1-(2-hydroxyethyl)-2H-cyclohex[d][1,3]oxazine*

A mixture of 1 g. of cis-A-octahydro-4-(p-methoxyphenyl)-2H-cyclohex[d][1,3]oxazine, 2.5 g. of 1-hydroxy-2-iodoethane, 1.5 g. of potassium carbonate in methylene chloride (50 ml.) was heated to reflux for 2 hours. The mixture was cooled, filtered, poured into 100 ml. of ice water, and the aqueous mixture extracted with methylene chloride. The methylene chloride extracts were washed with water, aqueous sodium chloride solution, then dried over anhydrous magnesium sulfate and evaporated. The thus-obtained residue was recrystallized from Skellysolve B hexanes-benzene to give cis-A-octahydro - 4-(p-methoxyphenyl)-1-(2-hydroxyethyl)-2H-cyclohex[d][1,3]oxazine.

EXAMPLE 97

*Cis-A-octahydro-4-(p-methoxyphenyl)-1-(2-ethoxyethyl)-2H-cyclohex[d][1,3]oxazine*

A mixture of 1 g. of cis-A-octahydro-4-(p-methoxyphenyl)-2H-cyclohex[d][1,3]oxazine, 3.0 g. of 1-ethoxy-2-iodoethane, 1.5 g. of potassium carbonate in methylene chloride (50 ml.) was heated to reflux for 2 hours. The mixture was cooled, filtered, poured into 100 ml. of ice water, and the aqueous mixture extracted with methylene chloride. The methylene chloride extracts were washed with water, aqueous saturated sodium chloride solution, then dried over anhydrous magnesium sulfate and evaporated. The thus-obtained residue was recrystallized from Skellysolve B hexanes-benzene to give cis-A-octahydro-4-(p - methoxyphenyl) - 1-(2-ethoxyethyl)-2H-cyclohex[d][1,3]oxazine.

EXAMPLE 98

*Cis-A-octahydro-4-p-(methoxyphenyl)-1-(3-hydroxypropyl)-2H-cyclohex[d][1,3]oxazine*

A mixture of 1 g. of cis-A-octahydro-4-(p-methoxyphenyl)-2H-cyclohex[d][1,3]oxazine, 2.5 g. of 1-hydroxy-3-iodopropane, 1.5 g. of potassium carbonate in methylene chloride (50 ml.) was heated to reflux for 2 hours. The mixture was cooled, filtered, poured into 100 ml. of ice water, and the aqueous mixture extracted with methylene chloride. The methylene chloride extracts were washed with water, aqueous saturated sodium chloride solution, then dried over anhydrous magnesium sulfate and evaporated. The thus-obtained residue was recrystallized from Skellysolve B hexanes-benzene to give cis-A-octahydro-4-(p - methoxyphenyl) - 1-(3-hydroxypropyl)-2H-cyclohex[d][1,3]oxazine.

EXAMPLE 99

*Octohydro-4-(p-fluorophenyl)-1-hexyl-2-(o-tolyl)-2H-cyclohex[d][1,3]oxazine*

In the manner given in Example 95, octahydro-4-(p-fluorophenyl) - 2-(o-tolyl)-2H-cyclohex[d][1,3]oxazine, hexyl iodide and potassium carbonate are reacted to give octahydro - 4 - (p-fluorophenyl)-1-hexyl-2-(o-tolyl)-2H-cyclohex[d][1,3]oxazine.

EXAMPLE 100

*Octahydro-4-(p-isopropoxyphenyl)-1-(2-hydroxyethyl)-2-(o-ethylphenyl)-2H-cyclohex[d][1,3]oxazine*

In the manner given in Example 95, octahydro-4-(p-isopropoxyphenyl) - 2-(o-ethylphenyl)-2H-cyclohex[d][1,3] oxazine, 1-hydroxy-2-iodoethane and potassium carbonate are reacted to to give octahydro-4-(p-isopropoxyphenyl)-1 - (2 - hydroxyethyl)-2-(o-ethylphenyl)-2H-cyclohex[d][1,3]oxazine.

EXAMPLE 101

*Octahydro-4-(p-hexylphenyl)-1-isopropyl-2-methylcyclopent[d][1,3]oxazine*

In the manner given in Example 95, octahydro-4-(p-hexylphenyl)-2-methylcyclopent[d][1,3]oxazine, isopropyl bromide and potassium carbonate are reacted to give octahydro - 4-(p-hexylphenyl)-1-isopropyl-2-methylcyclopent[d][1,3]oxazine.

EXAMPLE 102

*Octahydro-4-(p-fluorophenyl)-1-(3-hydroxypropyl)-2-pentylcyclopent[d][1,3]oxazine*

In the manner given in Example 95, octahydro-4-(p-fluorophenyl) - 2-pentylcyclopent[d][1,3]oxazine, 1-hydroxy-3-bromopropane and potassium carbonate are reacted to give octahydro-4-(p-fluorophenyl)-1-(3-hydroxypropyl)-2-pentylcyclopent[d][1,3]oxazine.

EXAMPLE 103

*Decahydro-4-(2,5-diisophenyl)-1-pentyl-2-methylcyclohept[d][1,3]oxazine*

In the manner given in Example 95, decahydro-4-(2,5-diiodophenyl)-2-methylcyclohept[d][1,3]oxazine, pentyl iodide and potassium carbonate are reacted to give decahydro - 4 - (2,5-diiodophenyl)-1-pentyl-2-methylcyclohept[d][1,3]oxazine.

EXAMPLE 104

*Decahydro-4-(3,4,5-triethoxyphenyl)-1-(3-methoxypropyl)cyclohept[d][1,3]oxazine*

In the manner given in Example 95, decahydro-4-(3,4,5-triethoxyphenyl)cyclohept[d][1,3]oxazine, 1-methoxy-3-iodopropane and potassium carbonate are reacted to give decahydro-4-(3,4,5-triethoxyphenyl)-1-(3-methoxypropoxy)cyclohept[d][1,3]oxazine.

EXAMPLE 105

*Decahydro-4-(p-butoxyphenyl)-1,2-dimethyl-2H-cyclooct[d][1,3]oxazine*

In the manner given in Example 95, decahydro-4-(p-butoxyphenyl) - 2 - methyl-2H-cyclooct[d][1,3]oxazine, methyl iodide and potassium carbonate are reacted to give decahydro - 4-(p-butoxyphenyl)1,2-dimethyl-2H-cyclooct[d][1,3]oxazine.

EXAMPLE 106

*Decahydro-4-(3,5-dipropylphenyl)-1-benzyl-2-(o-propylphenyl)-2H-cyclooct[d][1,3]oxazine*

In the manner given in Example 95, decahydro-4-(3,5-dipropylphenyl)-2-(o-propylphenyl)-2H-cyclooct[d][1,3]oxazine, benzyl chloride and potassium carbonate are reacted to give decahydro-4-(3,5-dipropylphenyl)-1-benzyl-2-(o-propylphenyl)-2H-cyclooct[d][1,3]oxazine.

EXAMPLE 107

*Decahydro-4-(2,3,4-trimethoxyphenyl)-1-(4-hydroxybutyl)-2-methyl-2H-cyclooct[d][1,3]oxazine*

In the manner given in Example 95, decahydro-4-(2,3,4 - trimethoxyphenyl)-2-methyl-2H-cyclooct[d][1,3]oxazine, 1-hydroxy-4-iodobutane and potassium carbonate are reacted to give decahydro-4-(2,3,4-trimethoxyphenyl)-1-(4-hydroxybutyl)-2-methyl-2H-cyclooct[d][1,3]oxazine.

EXAMPLE 108

*Decahydro-4-(p-trifluoromethylphenyl)-1-pentyl-2-phenylcyclohept[d][1,3]oxazine*

In the manner given in Example 95, decahydro-4-(p-trifluoromethylphenyl) - 2 - phenylcyclohept[d][1,3]oxazine, pentyl bromide and potassium carbonate are reacted to give decahydro-4-(p-trifluoromethylphenyl)-1-pentyl-2-phenylcyclohept[d][1,3]-oxazine.

Other 1-alkyl-, 1-benzyl-, 1-alkoxyalkyl-, 1-hydroxyalkyl - oxazines (Example 95) and 1-alkyl-, 1-benzyl-, 1-alkoxyalkyl-, 1-hydroxyalkyl-oxazin-2-ones (Example 83) can be synthesized by reacting a compound of Formula 11, in which R₀ is hydrogen with a halide of the kind illustrated above, and when

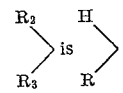

defined as hereinabove, with an inorganic base such as potassium carbonate, or, when

is oxygen with sodium hydride. Representative compounds thus obtained include:

octahydro-4-(2,4-diethoxyphenyl)-1-benzyl-2H-cyclohex[d][1,3]oxazin-2-one;
octahydro-4-(2,4-diethoxyphenyl)-1-(4-hydroxybutyl)-2H-cyclohex[d][1,3]oxazin-2-one;
octahydro-4-(2,4-dimethylphenyl)-1-hexyl-2H-cyclohex[d][1,3]oxazin-2-one;
octahydro-4-(p-bromophenyl)-1-(4-ethoxybutyl)-2H-cyclohex[d][1,3]oxazin-2-one;
octahydro-4-(p-iodophenyl)-1-pentyl-2H-cyclohex[d][1,3]oxazin-2-one;
octahydro-4-(p-fluorophenyl)-1-(5-methoxypentyl)-2H-cyclohex[d][1,3]oxazin-2-one;
octahydro-4-(2,5-diiodophenyl)-1-(2-hydroxypropyl)-2H-cyclohex[d][1,3]oxazin-2-one;
octahydro-4-(p-isopropylphenyl)-1-(2-hydroxyethyl)-2H-cyclohex[d][1,3]oxazin-2-one;
octahydro-4-(p-pentylphenyl)-1-isopropyl-2H-cyclohex[d][1,3]oxazin-2-one;
octahydro-4-(2,4-dibutoxyphenyl)-1-isobutyl-2H-cyclohex[d][1,3]oxazin-2-one;
octahydro-4-(o-bromophenyl)-1-(3-hydroxypropyl)-2H-cyclohex[d][1,3]oxazin-2-one;
hexahydro-4-(p-isopropylphenyl)-1-hexylcyclopent[d][1,3]oxazin-2(1H)-one;
hexahydro-4-(p-hexylphenyl)-1-pentylcyclopent[d][1,3]oxazin-2(1H)-one;
hexahydro-4-(p-butoxyphenyl)-1-(2-hydroxyethyl)cyclopent[d][1,3]oxazin-2(1H)-one;
hexahydro-4-(p-isopropylphenyl)-1-3-hydroxypropyl)cyclopent[d][1,3]oxazin-2(1H)-one;
hexahydro-4-(p-trifluoromethylphenyl-1-(4-hydroxybutyl)cyclopent[d][1,3]oxazin-2(1H)-one;
hexahydro-4-(2,4-diiodophenyl)-1-(2-methoxyethyl)cyclopent[d][1,3]oxazin-2(1H)-one;
hexahydro-4-(p-bromophenyl)-1-(2-methoxyethyl)cyclopent[d][1,3]oxazin-2(1H)-one;
octahydro-4-(2,5-diiodophenyl)-1-(2-methylpentyl)cyclohept[d][1,3]oxazin-2(1H)-one;
octahydro-4-(3,4-dipropylphenyl)-1-butylcyclohept[d][1,3]oxazin-2(1H)-one;
octahydro-4-(3,4,5-triethoxyphenyl)-1-(4-ethoxybutyl)cyclohept[d][1,3]oxazin-2(1H)-one;
octahydro-4-(o-chlorophenyl)-1-(4-hydroxybutyl)cyclohept[d][1,3]oxazin-2(1H)-one;
octahydro-4-(2,4-dichlorophenyl)-1-pentylcyclohept[d][1,3]oxazin-2(1H)-one;
octahydro-4-(p-trifluoromethylphenyl)-1-(3-hydroxypropyl)cyclohept[d][1,3]oxazin-2(1H)-one;
decahydro-4-(p-bromophenyl)-1-benzyl-2H-cyclooct[d][1,3]oxazin-2-one;
decahydro-4-(p-ethoxyphenyl)-1-methyl-2H-cyclohex[d][1,3]oxazin-2-one;
decahydro-4-(2,4-diethoxyphenyl)-1-ethyl-2H-cyclooct[d][1,3]oxazin-2-one;
decahydro-4-(o-fluorophenyl)-1-(3-hydroxypropyl)-2H-cyclooct[d][1,3]oxazin-2-one;
decahydro-4-(p-butoxyphenyl)-1-(3-methoxypropyl)-2H-cyclooct[d][1,3]oxazin-2-one;
decahydro-4-(3,4-dipropylphenyl)-1-(4-hydroxybutyl)-2H-cyclooct[d][1,3]oxazin-2-one;
decahydro-4-(m-ethoxyphenyl)-1-(2-ethoxyethyl)-2H-cyclooct[d][1,3]oxazin-2-one;
octahydro-4-(p-fluorophenyl)-1-(2-ethoxyethyl)-2-(o-tolyl)-2H-cyclohex[d][1,3]oxazine;
octahydro-4-(p-fluorophenyl)-1-(2-hydroxyethyl)-2-phenyl-2H-cyclohex[d][1,3]oxazine;
octahydro-4-(2-methoxy-4-methylphenyl)-1-butyl-2-(m-tolyl)-2H-cyclohex[d][1,3]oxazine;
octahydro-4-(3,5-dimethyl-4-methoxyphenyl)-1,2-diethyl-2H-cyclohex[d][1,3]oxazine;
octahydro-4-(p-trifluoromethylphenyl)-1-hexyl-2-methyl-2H-cyclohex[d][1,3]oxazine;
octahydro-4-(p-isopropylphenyl)-1-pentyl-2-phenyl-2H-cyclohex[d][1,3]oxazine;
octahydro-4-(2,3-diethylphenyl)-1-(4-hydroxybutyl)-2-(2-methoxyethyl)-2H-cyclohex[d][1,3]oxazine;
octahydro-4-(2,4-diethoxyphenyl)-1-(4-hydroxybutyl)-2-butyl-2H-cyclohex[d][1,3]oxazine;
octahydro-4-(p-hexylphenyl)-1,2-dimethylcyclopent[d][1,3]oxazine;
octahydro-4-(p-butoxyphenyl)-1-butyl-2-ethylcyclopent[d][1,3]oxazine;
octahydro-4-(p-isopropoxyphenyl)-1-(3-hydroxypropyl)-2-propylcyclopent[d][1,3]oxazine;

octahydro-4-(m-trifluoromethylphenyl)-1-benzyl-2-phenylcyclopent[d][1,3]oxazine;
octahydro-4-(2,4-diiodophenyl)-1-(2-methoxyethyl)-2-butylcyclopent[d][1,3]oxazine;
octahydro-4-(p-fluorophenyl)-1-(2-hydroxyethyl)-2-pentylcyclopent[d][1,3]oxazine;
decahydro-4-(3,4,5-triethoxyphenyl)-1-butyl-2-propylcyclohept[d][1,3]oxazine;
decahydro-4-(o-chlorophenyl)-1-pentyl-2-isobutylcyclohept[d][1,3]oxazine;
decahydro-4-(2,4-dichlorophenyl)-1-(2-ethoxyethyl)-2-phenylcyclohept[d][1,3]oxazine;
decahydro-4-(p-trifluoromethylphenyl)-1-(4-hydroxybutyl)-2-methylbutyl)cyclohept[d][1,3]oxazine;
decahydro-4-(p-iodophenyl)-1-methylcyclohept[d][1,3]oxazine;
decahydro-4-(p-iodophenyl)-1-hexylcyclohept[d][1,3]oxazine;
decahydro-4-(m-methylphenyl)-1-pentyl-2-methyl-2H-cyclooct[d]1,3]oxazine;
decahydro-4-(p-ethoxyphenyl)-1-(2-hydroxyethyl)-2-ethyl-2H-cyclooct[d][1,3]oxazine;
octahydro-4-(p-bromophenyl)-1,2-dipropyl-2H-cyclooct[d][1,3]oxazine;
decahydro-4-(2,4-diethoxyphenyl)-1-(3-hydroxypropyl)-2-isobutyl-2H-cyclooct[d][1,3]oxazine;
decahydro-4-(o-fluorophenyl)-1-(2-ethoxyethyl)-2-(2-methylbutyl)-2H-cyclooct[d][1,3]oxazine;
decahydro-4-(p-methoxyphenyl)-1-benzyl-2-phenyl-2H-cyclooct[d][1,3]oxazine;
decahydro-4-(p-butoxyphenyl)-1-methyl-2-tolyl-2H-cyclooct[d][1,3]oxazine; and the like.

EXAMPLE 109

*Cis-A-octahydro-4-(p-methoxyphenyl)-1-(2-acetoxyethyl)-2H-cyclohex[d][1,3]oxazine*

A mixture of 0.5 g. of cis-A-octahydro-4-(p-methoxyphenyl)-1-(2-hydroxyethyl)-2H-cyclohex[d][1,3]oxazine, 2 ml. of acetic anhydride and 2 ml. of pyridine was allowed to stand at room temperature for a period of 4 hours. The reaction mixture was thereupon poured into 100 ml. of ice water, the aqueous mixture stirred for 30 minutes and then extracted with three 50-ml. portions of methylene chloride. The methylene chloride portions were combined, washed with water, saturated aqueous sodium chloride solution, dried over anhydrous magnesium sulfate and evaporated to give a residue. The residue was recrystallized three times from benzene-Skellysolve B hexanes to give cis-A-octahydro-4-(p-methoxyphenyl) - 1 - (2 - acetoxyethyl) - 2H-cyclohex[d][1,3]oxazine.

EXAMPLE 110

*Octahydro-4-(p-methoxyphenyl)-1-(3-butyryloxypropyl)-2H-cyclohex[d][1,3]oxazine*

In the manner given in Example 109, octahydro-4-(p-methoxyphenyl)-1-(3 - hydroxypropyl) - 2H - cyclohex[d][1,3]oxazine, butyric anhydride and pyridine were allowed to react at room temperature to give octahydro-4 - (p-methoxyphenyl)-1-(3-butyryloxypropyl)-2H-cyclohex[d][1,3]oxazine.

EXAMPLE 111

*Octahydro-4-(2,4-diethoxyphenyl)-1-(4-lauroyloxybutyl)-2-butyl-2H-cyclohex[d][1,3]oxazine*

In the manner given in Example 109, octahydro-4-(2,4 - diethoxyphenyl) - 1 - (4-hydroxybutyl)-2-butyl-2H-cyclohex[d][1,3]oxazine, lauroyl chloride and pyridine were allowed to react at room temperature to give octahydro-4-(2,4 - diethoxyphenyl) - 1 - (4-lauroyloxybutyl)-2-butyl-2H-cyclohex[d][1,3]oxazine.

EXAMPLE 112

*Octahydro-4-(p-fluorophenyl)-1-(3-benzoyloxypropyl)-2-pentylcyclopent[d][1,3]oxazine*

In the manner given in Example 109, octahydro-4-(p-fluorophenyl) - 1 - (3 - hydroxypropyl) - 2 - pentylcyclopent[d][1,3]oxazine, benzoic anhydride and pyridine were allowed to react at room temperature to give octahydro-4 - (p - fluorophenyl) - 1 - (3 - benzoyloxypropyl) - 2-pentylcyclopent[d][1,3]oxazine.

EXAMPLE 113

*Decahydro - 4 - (p - trifluoromethylphenyl) - 1 - (4-hexanoyloxybutyl) - 2 - (2 - methylbutyl)cyclohept[d][1,3]oxazine*

In the manner given in Example 109, decahydro-4-(p-trifluoromethylphenyl) - 1 - (4 - hydroxybutyl) - 2 - (2-methylbutyl)cyclohept[d][1,3]oxazine, hexanoyl chloride and pyridine were allowed to react at room temperature to give decahydro-4-(p-trifluoromethylphenyl)-2-(4-hexanoyloxybutyl) - 2 - (2 - methylbutyl)cyclohept[d][1,3]oxazine.

EXAMPLE 114

*Decahydro - 4 - (2,3,4 - trimethoxyphenyl) - 1 - (4-phenylacetoxybutyl) - 2 - methyl - 2H - cyclooct[d][1,3]oxazine*

In the manner given in Example 109, decahydro-4-(2,3,4 - trimethoxyphenyl) - 1 - (4 - hydroxybutyl) - 2-methyl - 2H - cyclooct[d][1,3]oxazine, phenylacetyl bromide and pyridine were allowed to react at room temperature to give decahydro-4-(2,3,4-trimethoxyphenyl)-1-(4-phenylacetoxybutyl) - 2 - methyl - 2H - cyclooct[d][1,3]oxazine.

EXAMPLE 115

*Decahydro - 4 - (p - ethoxyphenyl) - 1 - [2 - (β - cyclopentylpropionoxy)ethyl] - 2 - ethyl - 2H - cyclooct[d][1,3]oxazine*

In the manner given in Example 109, decahydro-4-(p-ethoxyphenyl) - 1 - (2 - hydroxyethyl) - 2 - ethyl - 2H-cyclooct[d][1,3]oxazine, β-cyclopentylpropionyl chloride and pyridine were allowed to react to give decahydro-4-(p - ethoxyphenyl) - 1 - [2 - (β - cyclopentylpropionoxy)-ethyl]-2-ethyl-2H-cyclooct[d][1,3]oxazine.

EXAMPLE 116

*Octahydro-4-(p-fluorophenyl)-1-(4-phenylpropionyloxybutyl)-2H-cyclohex[d][1,3]oxazin-2-one*

In the manner given in Example 109, octahydro-4-(p-fluorophenyl) - 1 - (4 - hydroxybutyl) - 2H - cyclohex[d][1,3]oxazin-2-one, phenylpropionic anhydride and pyridine were allowed to react at room temperature to give octahydro - 4 - (p - fluorophenyl) - 1 - (4 - phenylpropionyloxybutyl)-2H-cyclohex[d][1,3]oxazin-2-one.

EXAMPLE 117

*Octahydro-4-(2,5-diiodophenyl)-1-(2-valeryloxyethyl)-cyclohept[d][1,3]oxazin-2(1H)-one*

In the manner given in Example 109, octahydro-4-(2,5-diiodophenyl) - 1 - (2 - hydroxyethyl)cyclohept[d][1,3]oxazin-2-(1H)-one, valeric anhydride and pyridine were allowed to react at room temperature to give octahydro-4 - (2,5 - diiodophenyl) - 1 - (2 - valeryloxyethyl)cyclohept[d][1,3]oxazin-2(1H)-one.

EXAMPLE 118

*Hexahydro-4-(p-isopropylphenyl)-1-(3-benzoyloxypropyl)cyclopent[d][1,3]oxazin-2(1H)-one*

In the manner given in Example 109, hexahydro-4-(p-isopropylphenyl) - 1 - (3 - hydroxypropyl)cyclopent[d][1,3]oxazin-2(1H)-one, benzoyl chloride and pyridine were allowed to react at room temperature to give hexahydro - 4 - (p - isopropylphenyl) - 1 - (3 - benzoyloxypropyl)cyclopent[d][1,3]oxazin-2(1H)-one.

Example 119

*Decahydro-4-(o-fluorophenyl)-1-(4-acetoxybutyl)-2H-cyclooct[d][1,3]oxazin-2-one*

In the manner given in Example 109, decahydro-4-(o-fluorophenyl) - 1 - (4 - hydroxybutyl) - 2H - cyclooct[d][1,3]oxazin-2-one, acetic anhydride and pyridine were allowed to react at room temperature to give decahydro-4 - (o - fluorophenyl) - 1 - (4 - acetoxybutyl) - 2H - cyclooct[d][1,3]oxazin-2-one.

Example 120

*Octahydro-4-(o-bromophenyl)-1-(3-crotonyloxypropyl)-2H-cyclohex[d][1,3]oxazin-2-one*

In the manner given in Example 109, octahydro-4-(o-bromophenyl) - 1 - (3 - hydroxypropyl) - 2H - cyclohex[d][1,3]oxazin-2-one, crotonyl chloride and pyridine were allowed to react at room temperature to give octahydro-4 - (o - bromophenyl) - 1 - (3 - crotonyloxypropyl) - 2H-cyclohex[d][1,3]oxazin-2-one.

In the manner in Example 109, other esters of alcohols of Formula II wherein $R_0$ is a hydroxyalkyl having from 2 to 4 carbon atoms, inclusive, are obtained by reacting such alcohol with an acid chloride, acid bromide or acid anhydride of an alkanoic acid, phenylalkanoic acid, cycloalkanoic acid, unsaturated hydrocarbon carboxylic acid, having from 2 to 12 carbon atoms, alkanesulfonic and benzenesulfonic acids. In this manner are obtained acetates, propionates, butyrates, isobutyrates, valerates, isovalerates, hexanoates, heptanoates, octanoates, nonanoates, decanoates, undecanoates, dodecanoates, benzoates, phenylacetates, α- and β-phenylpropionates, methanesulfonates, ethanesulfonates, benzenesulfonates, toluenesulfonates, crotonates, acrylates, chrysanthemummonocarboxylates, cinnamates, 1-, 2-, or 3-hexenoates, 1- and 2-butynoates, hexynoates, α- and β-cyclopentylpropionates, cyclohexanecarboxylates and the like of alcohols of formula:

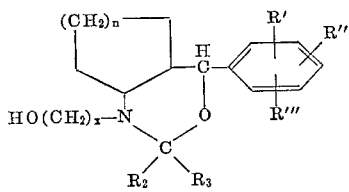

wherein $n$, $R_2$, $R_3$, $R'$, $R''$, $R'''$ are defined as hereinbefore and $x$ has a value of 2 to 4, inclusive.

Example 121

*Cis - B - α - (p - methoxyphenyl) - 2 - (dimethylamino)-cyclohexanemethanol from cis - B - octahydro - 4 - (p-methoxyphenyl) - 1 - methyl - 2H - cyclohex[d][1,3]oxazin-2-one*

To a solution of 0.01 mole of cis-B-octahydro-4-(p-methoxyphenyl) - 1 - methyl - 2H - cyclohex[d][1,3]oxazin-2-one in 100 ml. of tetrahydrofuran was added 0.01 mole of lithium aluminum hydride. The mixture was thereupon refluxed for 2 hours, cooled, water was added, and the mixture filtered. The precipitate obtained upon the filter was washed with methylene chloride and the washings were added to the filtrate. The filtrate was then extracted repeatedly with methylene chloride, the methylene chloride extracts were washed with water, saturated aqueous sodium chloride solution and then dried and evaporated to give cis-B-α-(p-methoxyphenyl)-2-(dimethylamino)cyclohexanemethanol.

Example 122

*α-(2,4-diiodophenyl)-2-methylethylamino)cycloheptanemethanol*

In the manner given in Example 121, octahydro-4-(2,4-diiodophenyl) - 1 - ethylcyclohept[d][1,3]oxazin - 2(1H)-one was treated with lithium aluminum hydride to give α-(2,4 - diiodophenyl) - 2 - (methylethylamino)cycloheptanemethanol.

Example 123

*α-(p-Bromophenyl)-2-(methylisobutylamino)cyclooctanemethanol*

In the manner given in Example 121, decahydro-4-(p-bromophenyl) - 1 - isobutyl - 2H - cyclooct[d][1,3]oxazin-2-one was treated with lithium aluminum hydride to give α - (p - bromophenyl) - 2 - (methylisobutylamino)-cyclooctanemethanol.

Example 124

*α-(3,4,5-trimethoxyphenyl)-2-(methylbutylamino)-cyclopentanemethanol*

In the manner given in Example 121, hexahydro-4-(3,4,5 - trimethoxyphenyl) - 1 - butylcyclopent[d][1,3]oxazin-2(1H)-one was treated with lithium aluminum hydride to give α - (3,4,5 - trimethoxyphenyl) - 2 - (methylbutylamino)cyclopentanemethanol.

Example 125

*α-(p-Hexylphenyl)-2-(N-methyl-4-ethoxybutylamino)cyclopentanemethanol*

In the manner given in Example 121, hexahydro-4-(p-hexylphenyl) - 1 - (4 - ethoxybutyl)cyclopent[d][1,3]oxazin-2(1H)-one was treated with lithium aluminum hydride to give α-(p-hexylphenyl)-2-(N-methyl-4-ethoxybutylamino)cyclopentanemethanol.

The above tertiary amino alcohols are central nervous stimulants, which can be used in the same manner as the central nervous stimulating oxazines and oxazones of this invention.

Other alcohols of the formula:

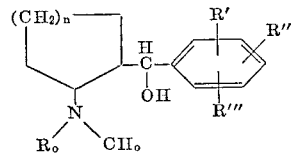

wherein $n$, $R_0$, $R'$, $R''$, $R'''$ are defined as above, can be produced by reducing with lithium aluminum hydride, the oxazin-2-ones shown in the prior examples and corresponding to Formula II wherein $R_2$ and $R_3$ together are oxygen.

The compounds having the formula:

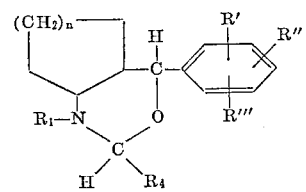

wherein $n$, $R_1$, $R_4$, $R'$, $R''$ and $R'''$ are defined as hereinbefore are of basic nature and give acid addition salts when admixed with inorganic or organic acids, and in particular, with pharmaceutically acceptable acids. Of special interest are the acid addition salts of the oxazines of Formula II with hydrochloric, sulfuric, hydrobromic, phosphoric, perchloric, acetic, lactic, tartaric, succinic, malic, maleic, citric, thiocyanic, trichloroacetic, fluosilicic acids and the like.

I claim:
1. A perhydrocycloalkoxazine of the formula:

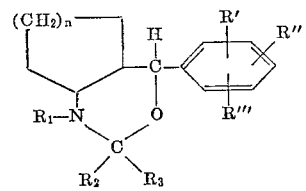

wherein $n$ has the value of 1 to 4, inclusive; wherein $R_1$ is selected from the group consisting of hydrogen, alkyl of 1 to 6 carbon atoms, inclusive, cycloalkyl, defined by the formula:

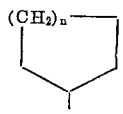

in which n has the value as above, alkoxyalkyl of 2 to 6 carbon atoms, inclusive, phenyl and phenyl with a substituent selected from the group consisting of alkyl and alkoxy of 1 to 6 carbon atoms, inclusive, benzyl, hydroxyalkyl of 2 to 4 carbon atoms, inclusive, hydroxyalkyl acylate esters in which the alkyl group of hydroxy alkyl is of 1 to 6 carbon atoms, inclusive, and the acyl group is of a hydrocarbon carboxylic acid of 2 to 12 carbon atoms, inclusive, selected from the group consisting of alkanoic, cycloalkanoic, benzoic, phenylacetic, alkenoic and alkynoic acids; wherein

is selected from the group consisting of

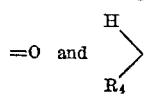

in which $R_4$ is selected from the group consisting of hydrogen, alkyl defined as above, phenyl, and alkyl-substituted phenyl in which alkyl is defined as above; and wherein R′, R″, and R‴ are selected from the group of substituents consisting of hydrogen, halogen, alkyl and alkoxy of 1 to 6 carbon atoms, inclusive, and —$CF_3$.

2. A compound according to claim 1, having the formula:

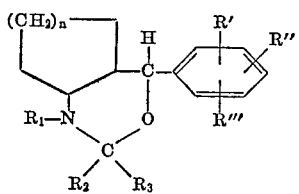

wherein n has the value of 1 to 4, inclusive; wherein $R_1$ is selected from the group consisting of hydrogen, alkyl of 1 to 6 carbon atoms, inclusive, cycloalkyl, defined by the formula:

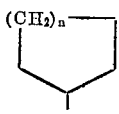

in which n has the value as above, alkoxyalkyl of 2 to 6 carbon atoms, inclusive, phenyl and phenyl with a substituent selected from the group consisting of alkyl and alkoxy of 1 to 6 carbon atoms, inclusive, benzyl, hydroxyalkyl of 2 to 4 carbon atoms, inclusive, hydroxyalkyl acylate esters in which the alkyl group of hydroxy alkyl is of 1 to 6 carbon atoms, inclusive and the acyl group is of a hydrocarbon carboxylic acid of 2 to carbon atoms, inclusive, selected from the group consisting of alkanoic, cycloalkanoic, benzoic, phenylacetic alkenoic and alkynoic acids; wherein $R_4$ is selected from the group consisting of hydrogen, alkyl defined as above phenyl, and alkyl-substituted phenyl in which alkyl defined as above; and wherein R′, R″, and R‴ are selected from the group of substituents consisting of hydrogen, halogen, alkyl and alkoxy of 1 to 6 carbon atoms, inclusive, and —$CF_3$ or a pharmaceutically acceptable acid addition salt thereof.

3. Cis - A - octahydro-4-(p-methoxyphenyl)-1-methyl 2H-cyclohex[d][1,3]oxazine of an ultraviolet spectrum $\lambda_{max.}$ 226 (11,900); 268 slight shoulder; 276 (1,600); 283 (1,300).

4. Cis - B - octahydro-4-(p-methoxyphenyl)-1-methyl 2H-cyclohex[d][1,3]oxazine of an ultraviolet spectrum $\lambda_{max.}$ 226 (12,700); 268 slight shoulder; 274 (1,500); 281 (1,300).

5. Cis - A - octahydro-4-(p-methoxyphenyl)-1-methyl 2-phenyl-2H-cyclohex[d][1,3]oxazine of melting point of about 113 to 114° C.

6. Cis - B - octahydro-4-(p-methoxyphenyl)-1-methyl 2-phenyl-2H-cyclohex[d][1,3]oxazine of a melting point of about 128–129° C.

7. Cis - A - octahydro-4-(p-methoxyphenyl)-1-methyl 2H-cyclohex[d][1,3]oxazin-2-one of a melting point o about 121–122° C.

8. Cis - A - octahydro-4-(p-methoxyphenyl)-1-methyl 2H-cyclohex[d][1,3]oxazin-2-one of a melting point o about 139-141° C.

9. Cis - B - octahydro-4-(p-methoxyphenyl)-1-methyl 2H-cyclohex[d][1,3]oxazin-2-one of a melting point o about 187–188° C.

10. Cis - A - octahydro - 4 - (p-methoxyphenyl)-2H cyclohex[d][1,3]oxazin-2-one of a melting point of abou 246–247° C.

11. Cis - B - octahydro - 4 - (p - methoxyphenyl)-2H cyclohex[d][1,3]oxazin-2-one of a melting point of abou 156–157° C.

References Cited

UNITED STATES PATENTS

| 2,911,294 | 11/1959 | Eden | 260—244 |
| 2,940,971 | 6/1960 | Lott | 260—244 |
| 3,004,025 | 10/1961 | Van Campen et al. | 260—244 |

OTHER REFERENCES

Cope et al.: Jour. Amer. Chem. Soc., vol. 82, pp. 4656–62 (1960).

Sorkin et al.: Helv. Chim. Acta., vol. 32, pp. 63–8 (1949).

HENRY R. JILES, *Primary Examiner.*

NATALIE TROUSOF, *Assistant Examiner.*

U.S. Cl. X.R.

260—247, 293, 326.8, 438.1, 501.1, 570.5, 570.9, 591, 999

UNITED STATES PATENT OFFICE
CERTIFICATE OF CORRECTION

Patent No. 3,452,011               Dated June 24, 1969

Inventor(s) Louis L. Skaletzky

It is certified that error appears in the above-identified patent and that said Letters Patent are hereby corrected as shown below:

Column 1, line 33, for "Field of Invention" read -- 1. Field of Invention --. Column 2, line 4, for, "th group" read -- the group --; line 41, for "cyclohenty" read -- cyclopentyl --. Column 3, line 13, for "carbonyldimidazole" read -- carbonyldiimidazole --; line 36, for "provdes" read -- provides --. Column 4, lines 70 and 71, for "carbonyldimidazole" read -- carbonyldiimidazole --. Column 5, line 30, for "epoxides" read -- epoxide --; line 63, for "atomsphere" read -- atmospher --; line 64, for "temperature 5 to" read -- temperature between 5 --. Column 6, line 3, for "5-tirmethoxy" read -- trimethoxy --; line 14, for "recation" read -- reaction --. Colum 14, line 60, for "228 (16,750)" read -- 228 (16,150) --. Colum 17, line 2, for "C, 77.90" read -- C, 71.90 --; line 57, for "C, 57.81" read -- C, 57.91 --. Column 18, line 6, for "trimethoxybezyl" read -- trimethoxybenzoyl --; line 19, for "consectuively" read -- consecutively --. Column 20, line 5, for "N, J." read -- New Jersey, --. Column 22, line 12, for "[1,3] oxazine" read -- [1,3]oxazine --. Column 23, line 42, for "of α(2,4-" read -- of α-(2,4- --; line 72, for "(p-bromphenyl)" read -- (p-bromophenyl); line 73, for "to give a" read -- to give --. Column 24, line 40, for "cyclohepty" read -- cyclohept --. Column 26, line 62, for "(2,3-diehylphenyl)" read -- (2,3-diethylphenyl)--. Column 27, line 70, for "(o-prophenyl)" read -- (o-propylphenyl). Column 28, line 3, for "2-isopropyl-2H isopropyl-2H-cyclooct" read -- 2-isopropyl-2H-cyclooct --. Column 31, line 5, for "oxazine-2one" read - oxazine-2-one --. Column 32, line 5, for "2-butylamino" read -- 2-(butylamino)--. Column 36, line 10, for "(p-methoxyphenyl)-methyl-" read -- (p-methoxyphenyl)-1-methyl --. Column 38, line 14, for "4-p-methoxyphenyl)" read -- 4-(p-methoxyphenyl) --; line 69, for "4-(2,5-siisophenyl) read -- 4-(2,5-diiodophenyl)--. Column 39, line 8, for "(3-methoxypropoxy)" read -- (3-methoxypropyl)--;

FORM PO-1050 (10-69)

UNITED STATES PATENT OFFICE
CERTIFICATE OF CORRECTION

Patent No. 3,452,011      Dated June 24, 1969

Inventor(s) Louis L. Skaletzky      PAGE - 2

It is certified that error appears in the above-identified patent and that said Letters Patent are hereby corrected as shown below:

line 55 for " $\overset{H}{\underset{R}{\diagdown}}$ " read -- $\overset{H}{\underset{R_4}{\diagdown}}$ --. Column 41, line 14, for "butyl)-2-methybutyl)" read -- butyl)-2-(2-methylbutyl) --. Column 41, line 20, for "[d]1,3]" read -- [d][1,3] --. Column 43, line 21, for "manner in" read -- manner given in --; line 69, for "2-methylethylamino)" read -- 2-(methylethylamino) --. Column 44, lines 33 through 40 should read as below:

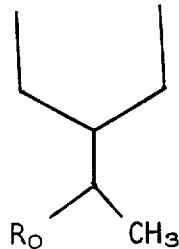

Signed and sealed this 23rd day of February 1971.

(SEAL)
Attest:

EDWARD M. FLETCHER, JR.
Attesting Officer

WILLIAM E. SCHUYLER, JR
Commissioner of Patents